US00RE36578E

United States Patent [19]

Kobayashi et al.

[11] E Patent Number: Re. 36,578

[45] Reissued Date of Patent: Feb. 22, 2000

[54] IMAGE STABILIZING APPARATUS

[75] Inventors: Takashi Kobayashi; Shigeru Ogino, both of Tokyo; Kazuhiro Noguchi, Kawasaki, all of Japan

[73] Assignee: Canon Kabushiki Kaisha, Tokyo, Japan

[21] Appl. No.: 08/598,374

[22] Filed: Feb. 8, 1996

Related U.S. Patent Documents

Reissue of:

[64] Patent No.: 5,285,313
Issued: Feb. 8, 1994
Appl. No.: 08/054,952
Filed: Apr. 29, 1993

U.S. Applications:

[

[63] Continuation of application No. 07/928,157, Aug. 10, 1992, abandoned, which is a continuation of application No. 07/706,400, May 28, 1991, abandoned.

[30] Foreign Application Priority Data

May 29, 1990 [JP] Japan ..... 2-137187

[51] Int. Cl.[7] ..... G02B 27/64; G02B 23/00

[52] U.S. Cl. ..... 359/554; 359/557

[58] Field of Search ..... 359/554–557; 348/208

[56] References Cited

U.S. PATENT DOCUMENTS

| | | | |
|---|---|---|---|
| 3,468,596 | 9/1969 | Alvarez | 359/557 |
| 3,756,687 | 9/1973 | Shin et al. | 359/557 |
| 3,944,324 | 3/1976 | Tajima et al. | 359/557 |
| 4,316,649 | 2/1982 | Alvarez | 359/556 |
| 4,713,697 | 12/1987 | Gotou et al. | 348/208 |
| 4,856,882 | 8/1989 | Oshima et al. | 350/500 |
| 4,970,540 | 11/1990 | Vasey et al. | 359/554 |
| 5,020,890 | 6/1991 | Oshima et al. | 359/554 |
| 5,089,911 | 2/1992 | Weyrauch et al. | 359/554 |
| 5,450,126 | 9/1995 | Nishida | 348/208 |

FOREIGN PATENT DOCUMENTS 69-215227 12/1985 Japan .

*Primary Examiner*—Jon W. Henry
*Attorney, Agent, or Firm*—Robin, Blecker & Daley

[57] ABSTRACT

An image stabilizing apparatus for correcting a blur of image by using correcting optical means supported in a manner capable of relative displacement in relation to the lens-barrel is adapted to include: detection means for detecting the state of the relative displacement of the correcting optical means in relation to the lens-barrel; amplifier means for amplifying the output of the detection means at an amplification degree corresponding to the state of the relative displacement of the correcting optical means in relation to the lens-barrel; and judging means for judging the state of the relative displacement of the correcting optical system in relation to the lens-barrel in response to the output of the amplifier means.

81 Claims, 15 Drawing Sheets

IMAGE STABILIZING APPARATUS

Matter enclosed in heavy brackets [ ] appears in the original patent but forms no part of this reissue specification; matter printed in italics indicates the additions made by reissue.

This is a continuation application under 37 CFR 1.62 of prior application Ser. No. 928,157, filed Aug. 10, 1992, now abandoned, which was a continuation application under 37 CFR 1.62 of prior application Ser. No. 706,400, filed May 28, 1991 now abandoned.

BACKGROUND OF THE INVENTION

1. Field of the Invention

The present invention relates to an improvement in image stabilizing apparatus for preventing a blur of image of an optical equipment occurring for example due to hand vibration.

2. Related Background Art

Some optical equipments have been known to be provided with a function for preventing a blur of image caused for example by hand vibration.

For example, U.S. Pat. No. 2,959,088 and U.S. Pat. No. 2,829,557 and others disclose such apparatus in which a correcting optical system is arranged in a movable manner and its inertia is used to prevent a blur of an image.

FIG. 13 illustrates the overall construction of this type of image stabilizing apparatus, where lenses 1, 2 constitute an optical system for correcting an image blur for principal lenses 12, 13 which are fixed to a lens-barrel 4 (hereinafter referred to as "barrel") for forming an image on a focal plane 14. Supposing that $f_1$ is the focal length of the lens 1 having a negative power and fixed to the barrel 4 and $f_2$ is the focal length of the lens 2 having a positive power and supported on a movable support member 3, the focal lengths of the correcting optical system are determined to satisfy the following relationship:

$$f_1=-f_2.$$

Said movable support member 3 is supported on the barrel 4 at the position spaced apart by the distance equal to the focal length $f_2(=-f_1)$ from the image side principal point of the lens 2 by means of gimbals 5 which are provided to effect a double-axle support FIG. 14 shows the construction of such double-axle support by the gimbals 5, where the movable support member 3 holding the lens 2 is supported by a support member 5y having a degree of freedom around the y-axis, while the support member 5y is supported by a support member 5x having a degree of freedom around the x-axis which is perpendicular to the direction of the y-axis, and furthermore the support member 5x is supported on the barrel 4 so as to construct an optical system having degrees of rotational freedom with respect to two axis.

Referring to FIG. 13, numeral 10 denotes a counter weight serving as a balancer to achieve a balance in the movable support member 3, mounted on the movable support member 3 at the side opposite from the lens 2 by interposing the gimbals 5 so that a balance with the lens 2 may be obtained with respect to the gimbal 5.

With the construction as described, it is possible to achieve a stabilizing optical system of the so called inertia pendulum type. That is, by using a construction as shown in FIG. 13, a blur of image may be prevented in a manner which will be described below.

If for example the construction as shown in FIG. 13 is that of a telescope, an optical image of an object is formed on the focal plane 14 through the principal lenses 12, 13 and correcting optical system 1, 2 at the interior of the barrel 4 which is directed toward the object. In a telescope having a high magnifying power, if held by hand, a vibration having frequency components in the range of 0.1~10 Hz occurs at the barrel 4 such as due to a hand vibration and such vibration is responsible for a blur of image.

When the above described optical mechanism is used, however, the inertia of the movable support member 3 causes a relative displacement between the lens 2 and the lens 1 in response to such vibration, and the blur of image as described is to be restrained by the relative displacement between the lens 2 and the lens 1.

Referring to FIG. 13, a member 9 attached to the movable support member 3 is a conductor made of a nonmagnetic material such as a piece of aluminum. A restraining force (damping force) corresponding to the vibrating rate of the barrel 4 is generated by the magnetic effect formed by magnets 6 and 7 which are fixed to the barrel 4. This is required to produce a damping effect so as to prevent the movable support member 3 from contacting the inner wall of the barrel 4 when the barrel 4 is abruptly displaced for example to change image composition.

In particular, a damping effect is obtained such that an eddy current occurring on the conductor 9 by the magnets 6, 7 as shown in the enlarged view in FIG. 15 generates a force in a direction so as to reduce the displacement of the movable support member 3 from the center of movement at which the optical axis of the lens 2 coincides with the optical axis of the principal lenses 12, 13 (principal optical axis 15).

It should be noted that, while the magnets 6, 7 in FIG. 15 are mounted only on the upper portion of the barrel 4 and thus an omission is made therein to facilitate the illustration, similar magnets are also provided at the lower portion as well as at the left and right of the barrel 4 so as to effect a double-axle support.

Referring to FIG. 13, numeral 11 denotes a magnetic body attached to the movable support member 3 integrally with the counter weight 10, effecting a centering operation by the magnetic effect produced in relation to a magnet 8 fixed to the barrel 4 to bring the movable support member 3 back to the center of the movable range at which the optical axis of the lens 2 coincides with the principal optical axis 15. Such centering operation is required to remove those portions of the displacement corresponding to a manufacturing error and the direct current component among the frequency components of the displacement so that the optical axis of the lens 2 coincides with the principal optical axis 15, because, if no vibration occurs, a better optical characteristic is obtained by using the center portion of the lens 2.

Specifically, the magnetic body 11 and the magnet 8 are placed to face each other by the same polarity (N-polarity) as shown in the enlarged view of FIG. 15, magnetically repelling each other. Since the center of the magnet 8 coincides with the principal optical axis 15, a centripetal force (centering force) is generated such that the optical axis of the lens 2 is caused to coincide with the principal optical axis 15.

Thus, the structure for damping and the structure for centering as described above can improve the characteristic of an image stabilizing apparatus which is based on the inertia pendulum method.

In actual taking, however, such operations as panning (in which the barrel 4 is horizontally moved to change the image composition) and tilting (in which the barrel 4 is vertically moved to change the image composition) are frequently performed to follow the subject or to change the subject.

The above described structures constitute a system for stabilizing operation fundamentally considering only a static condition where such operations are not to be performed. Although it produces a stabilizing effect for such vibrations as hand vibrations, an unnatural movement of image may result because for example the stabilizing effect is reduced or the correcting optical system remains at a position largely deviated in one direction or collides with the inner wall of the barrel 4 due to the movement in practical panning or tilting where a unidirectional movement is to be continued.

Thus, the present applicant has filed an application (U.S. patent application Ser. No. 516,303) in which control functions for giving torques around the x-axis and y-axis are set in the image stabilizing system to adjust the operation with respect to panning and tilting so that control of the correcting optical system is achieved in accordance with such control functions Such apparatus mainly includes: a torque generation means for controlling the movement of the correcting optical system to prevent a collision with the inner wall of the barrel which tends to occur such as in panning and tilting operations; a control signal generating means for controlling said generation means; and a position detecting means for detecting the state of displacement of the correcting optical system in relation to the barrel as an input signal for processing to generate the control signal.

The control signal generating means as described gives a non-linear torque in response to the displacement of the movable support member 3 which constitute an inertia pendulum so as to satisfy two opposing factors that are the prevention of an excessive movement and stabilization of the lenses related to panning or tilting.

An example of the characteristic of such control torque is shown in FIG. 16.

With the characteristic of the control torque as shown in FIG. 16, a torque for centering and damping is hardly generated when the movable support member 3 is positioned near the center of movement so as not to impede the stabilizing effect by the inertia pendulum. When for example the barrel 4 is moved in a considerable degree toward one direction such as for panning, however, if the movable support member 3 is largely displaced from the center of the movement due to the effect of the inertia pendulum, centering and damping force increasing sharply with a further increase in such displacement is generated to bring the movable support member 3 back to the center of movement, i.e., to produce a large control torque. Thus it is possible to prevent the collision of the movable support member 3 with the inner wall of the barrel 4.

Since however there is a limit in the amount of signals to be read from the position detecting means by the above described control signal generating means, the resolution is necessarily lowered for example in the above described correcting optical system where the movable range is wide, resulting in a problem that the above described torque control cannot be accurately performed.

Further, while to some extent an inaccuracy in the control torque is not much of a problem if the correcting optical system is largely displaced from the center of movement as it is the state where a large deviation is occurring, there has been a considerable problem that an inferior resolution causes an excessive movement of the correcting optical system due to the centering force and dampling force as described when the correcting optical system is near the center of movement as it is the state where the deviation is not too large, and as a result not only the stabilizing effect is impeded but also the correcting optical system is caused to vibrate (reciprocate).

SUMMARY OF THE INVENTION

The present invention has been made in view of the considerations as described above. One of its objects is to provide an image stabilizing apparatus for correcting blur of image by means of a correcting optical means supported in a manner capable of relative displacement in relation to the barrel. Said image stabilizing apparatus includes: detection means for detecting the state of relative displacement of the correcting optical means with respect to the barrel; amplifier means for amplifying the output of said detection means in an amplification degree corresponding to said state of relative displacement of the correcting optical means with respect to the barrel; and judging means for judging the state of relative displacement of the correcting optical means with respect to the barrel in response to the output of the amplifier means. Thus, for a limited input range of the judging means, the output of the detection means is inputted into the judging means at the amplification degree corresponding to the state of displacement of the correcting optical means so as to improve the controlling resolution especially near the center of movement of the correcting optical means.

Other objects of the present invention will be apparent from the specific embodiments described below.

DETAILED DESCRIPTION OF THE PREFERRED EMBODIMENTS

An embodiment of the present invention will now be described in detail with reference to the drawings.

Figure 3:
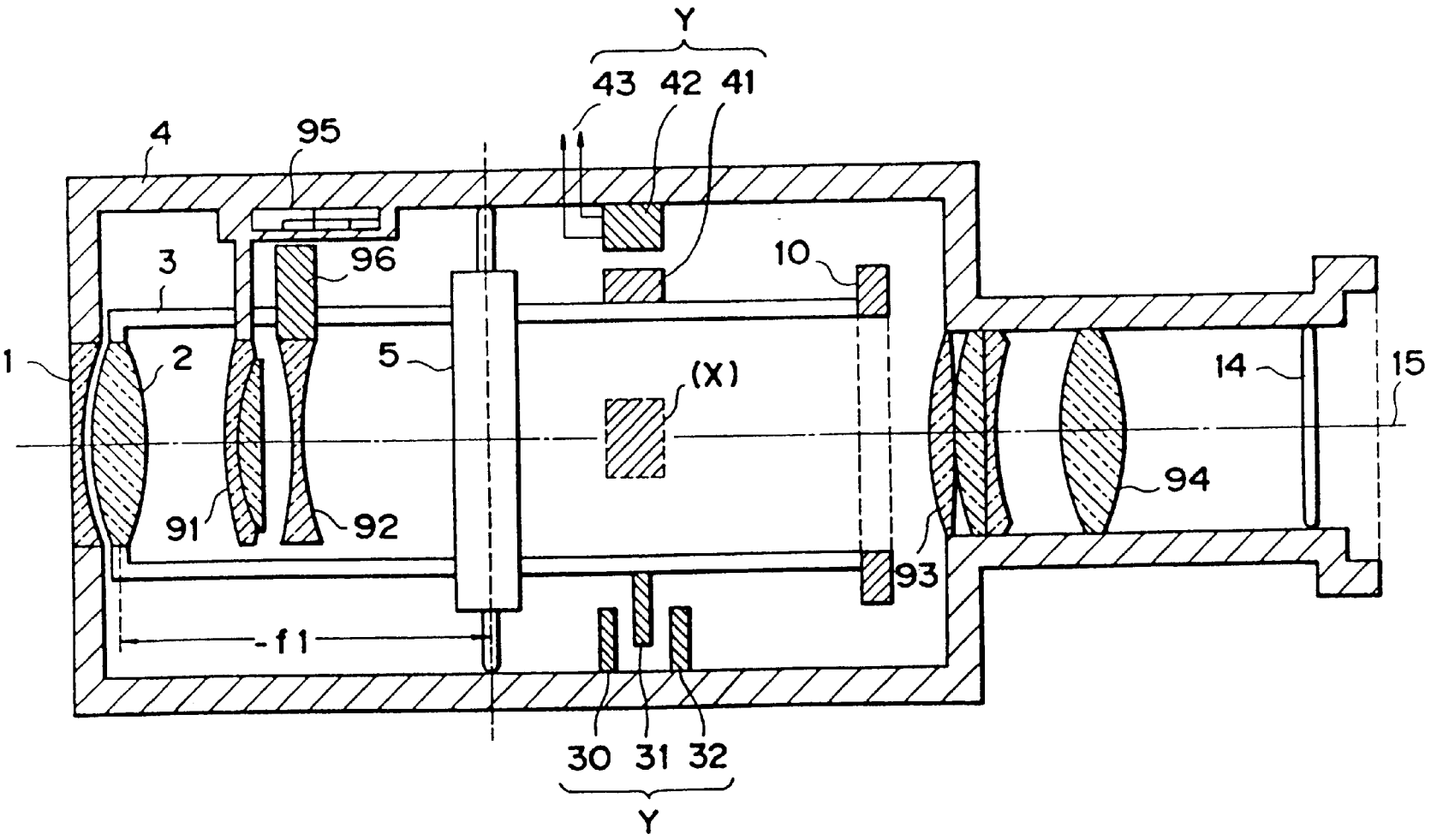
FIG. 3 is a sectional view showing the construction of the image stabilizing apparatus of the present invention.
Figure 13:
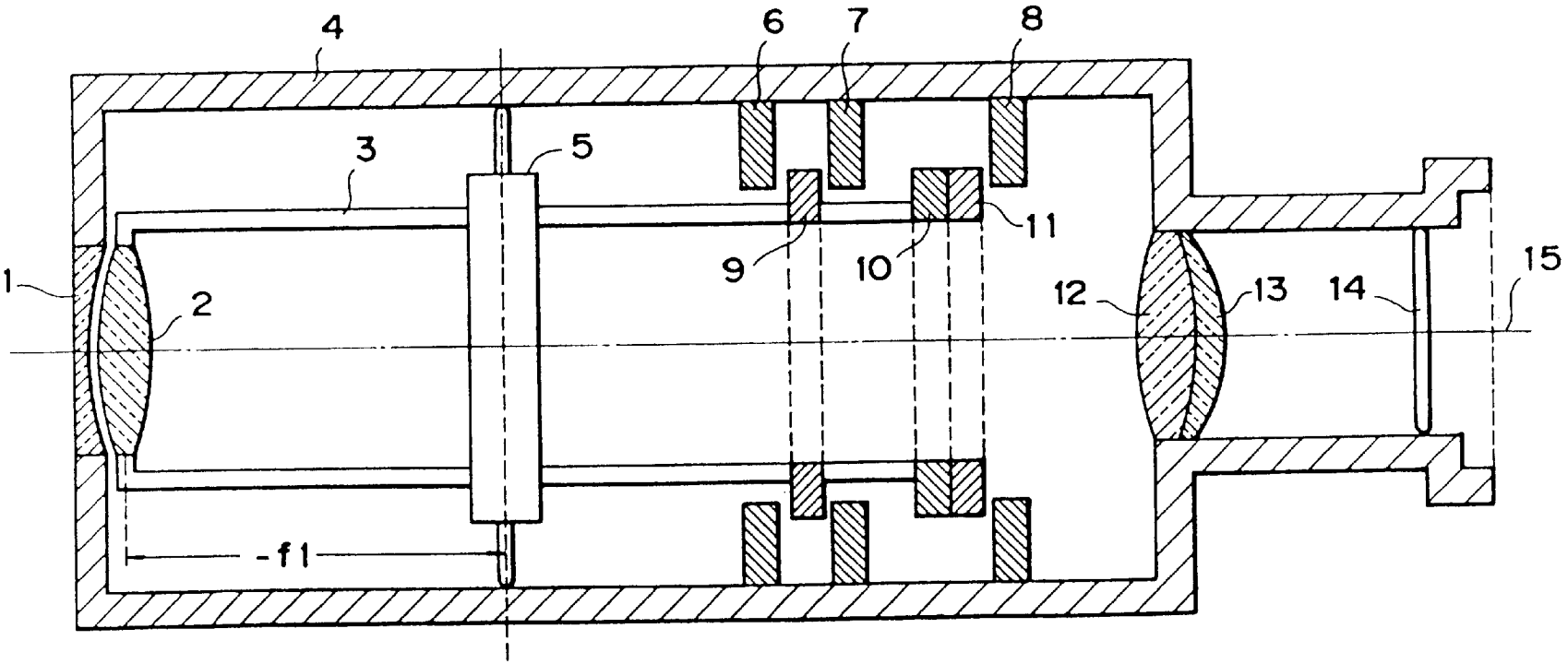
FIG. 13 PRIOR ART
FIG. 13 is a sectional view showing the construction of an image stabilizing apparatus to illustrate a conventional example.
Figure 14:
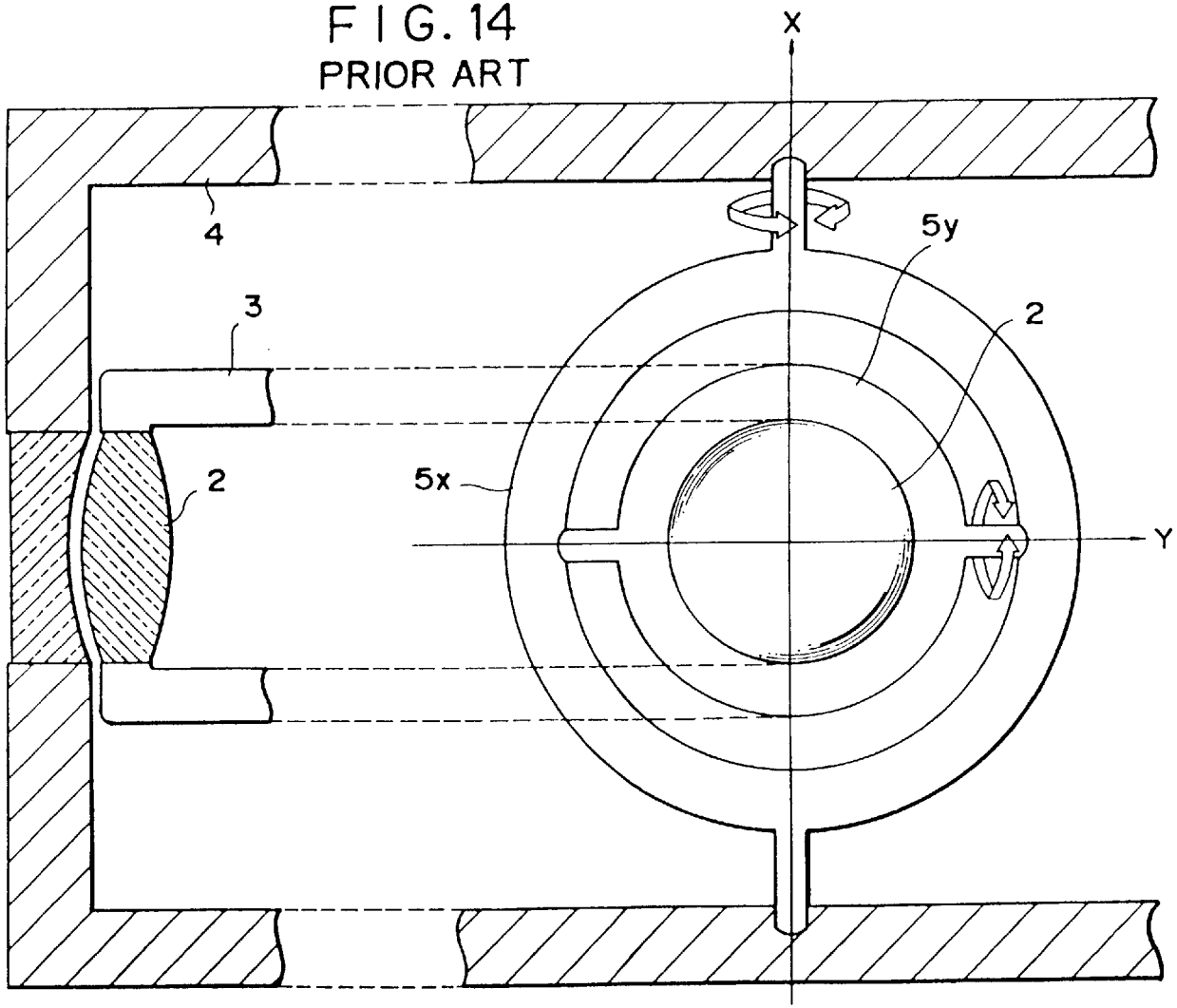
FIG. 14 PRIOR ART
FIG. 14 is an enlarged view illustrating a portion of the supporting construction using gimbals as shown in FIG. 13.
Figure 15:
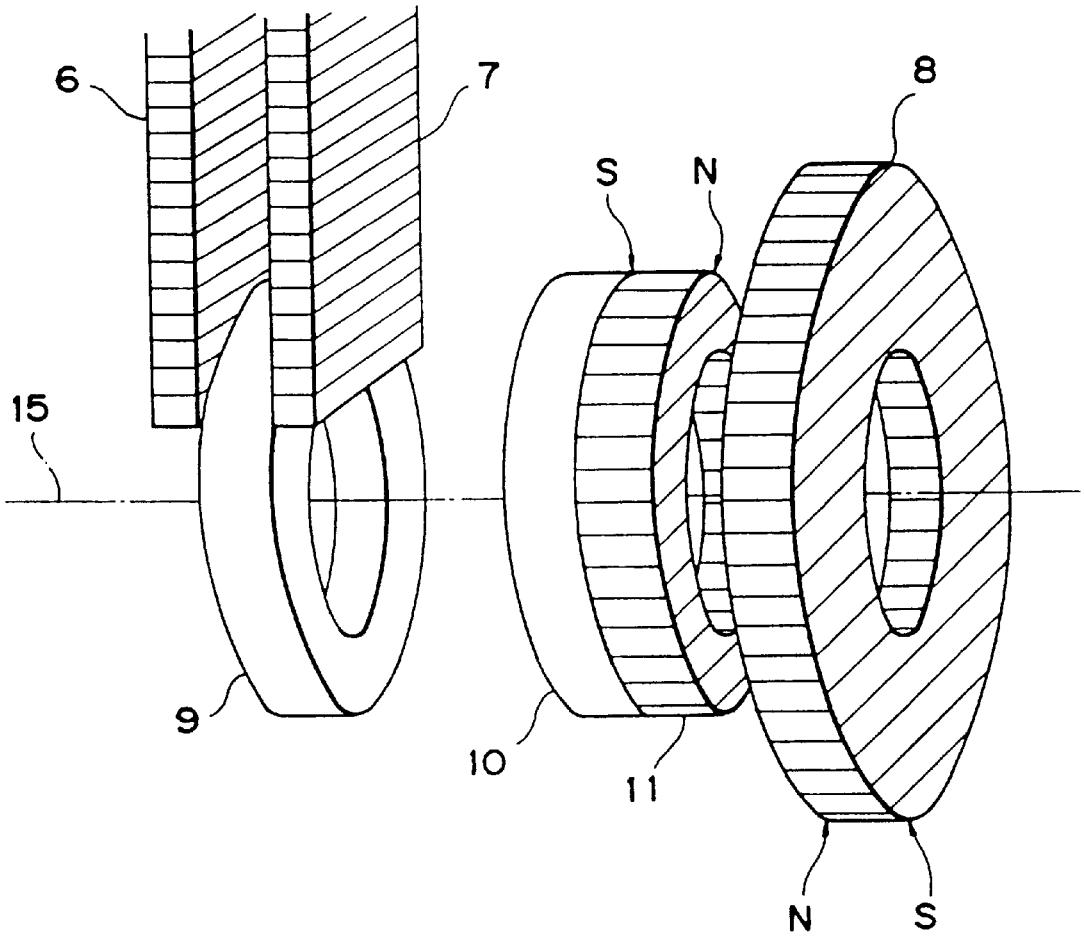
FIG. 15 PRIOR ART
FIG. 15 is an enlarged view showing a portion of the construction as shown in FIG. 13.
Figure 16:
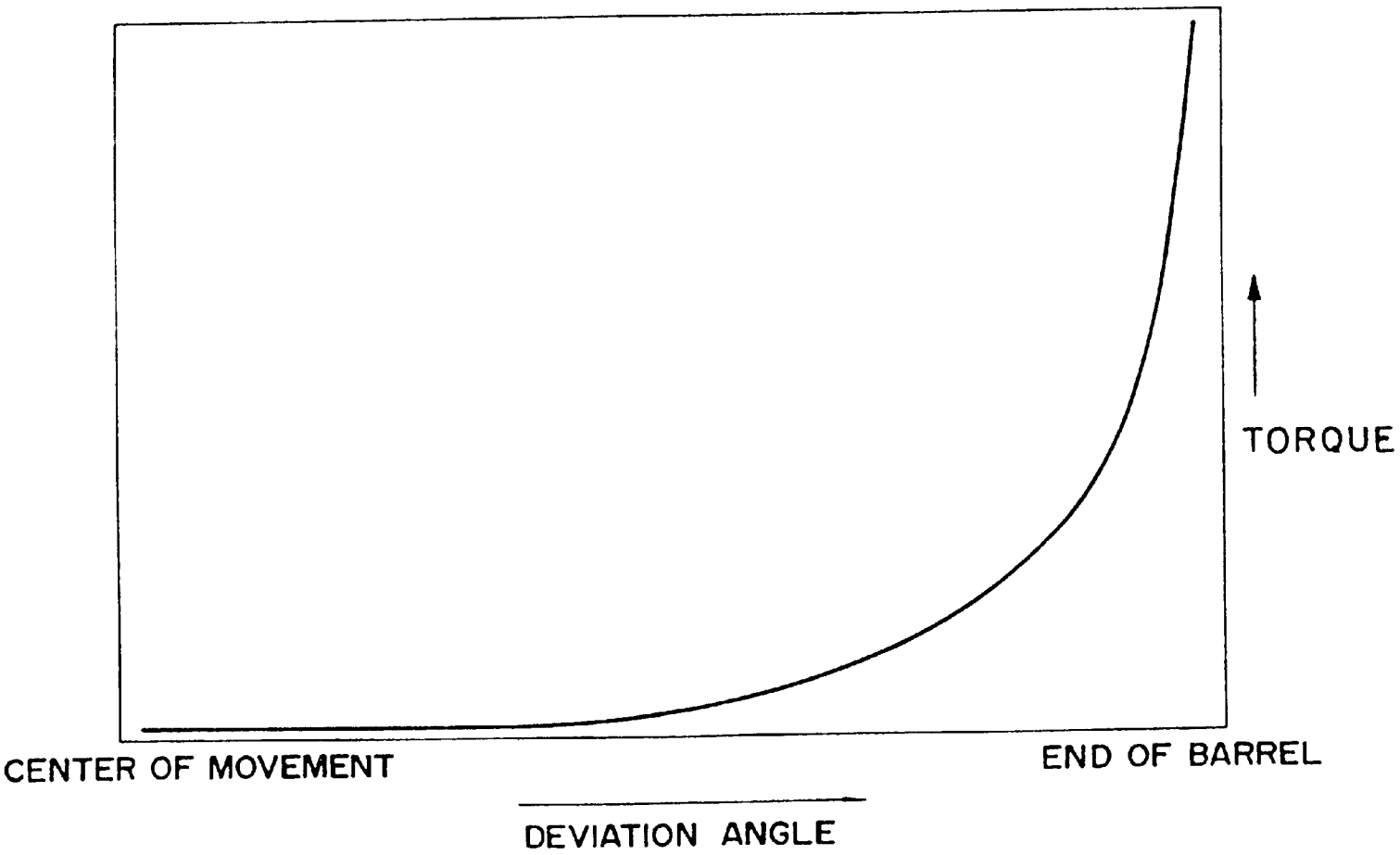
FIG. 16 is a characteristic curve of control torque which underlies the control system in the image stabilizing apparatus previously applied for patent by the present applicant.

FIG. 3 shows the construction of an image stabilizing apparatus according to an embodiment of the present invention, based on the inertia pendulum method in a similar manner as the image stabilizing apparatus as shown in FIG. 13, wherein the same reference numerals as in FIG. 13 are given to those identical portions and detailed description thereof is omitted.

Referring to FIG. 3, the principal taking system includes a front-placed lens 91, a variable magnification lens 92, and fixed lenses 93, 94 for forming an image, where the variable magnification lens 92 is arranged in a movable manner for changing of the focal length by means of a moving ring 96. The moved position of the variable magnification lens 92 may be detected by a variable magnification encoder 95 (hereinafter referred to as ENC), and it is possible to know the state of focal length of the taking optical system by the output of the ENC 95. In FIG. 3, the ENC 95 is shown as of a 2-bit optical reflecting system.

A sensor system (30, 31, 32) is provided on a barrel 4 and on a movable support member 3 while a torque generator system (41, 42, 43) is axisymmetrically provided. Further, the x-axis and y-axis are constructed in a similar manner with each other and the x-axis and y-axis are arranged in orthogonal position.

Figure 4:
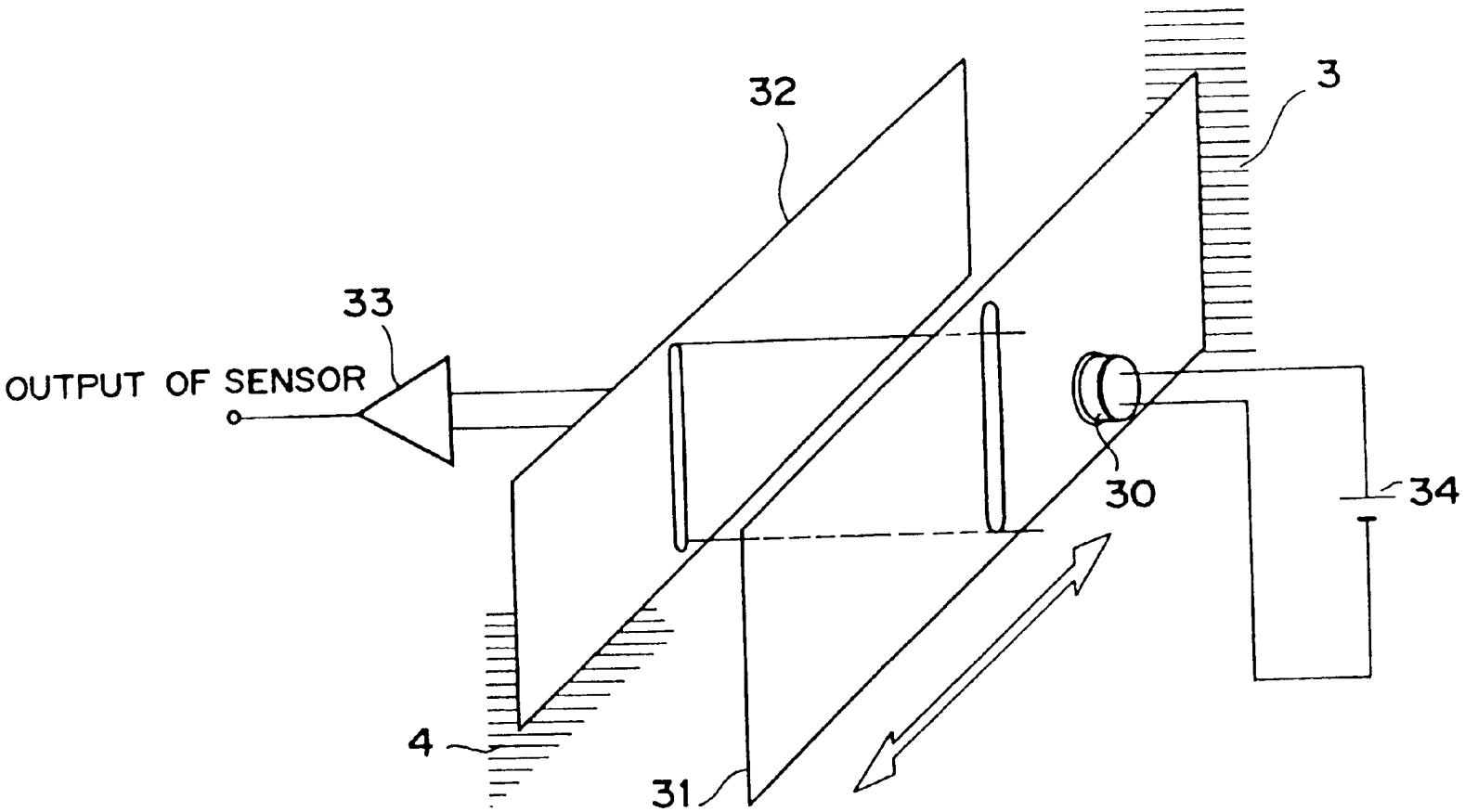
FIG. 4 is a perspective view showing an example of composition of a sensor system as shown in FIG. 3.

The construction of the sensor system (30. 31 32) is shown in FIG. 4. This system comprises; a light emitting element 30 such as of an LED attached to the inner wall of the barrel 4; a power source 34 for the light emitting element 30; a unidimensional light receiving position detecting clement 32 for receiving such light; and a slit curtain 31 attached to the movable support member 3.

Since the slit curtain 31 provided between the light emitting element 30 and the unidimensional light receiving position detecting element 32 is moved in the direction of the arrow as shown in the figure with the movement of the movable support member 3 which holds the lens 2 serving as the correcting optical system, a signal is detected from the light receiving position detecting element 32 corresponding to its deviation angle, the detected result being provided from a sensor amplifier 33 as a displacement signal of the movable support member 3 in relation to the barrel 4.

Figure 5:
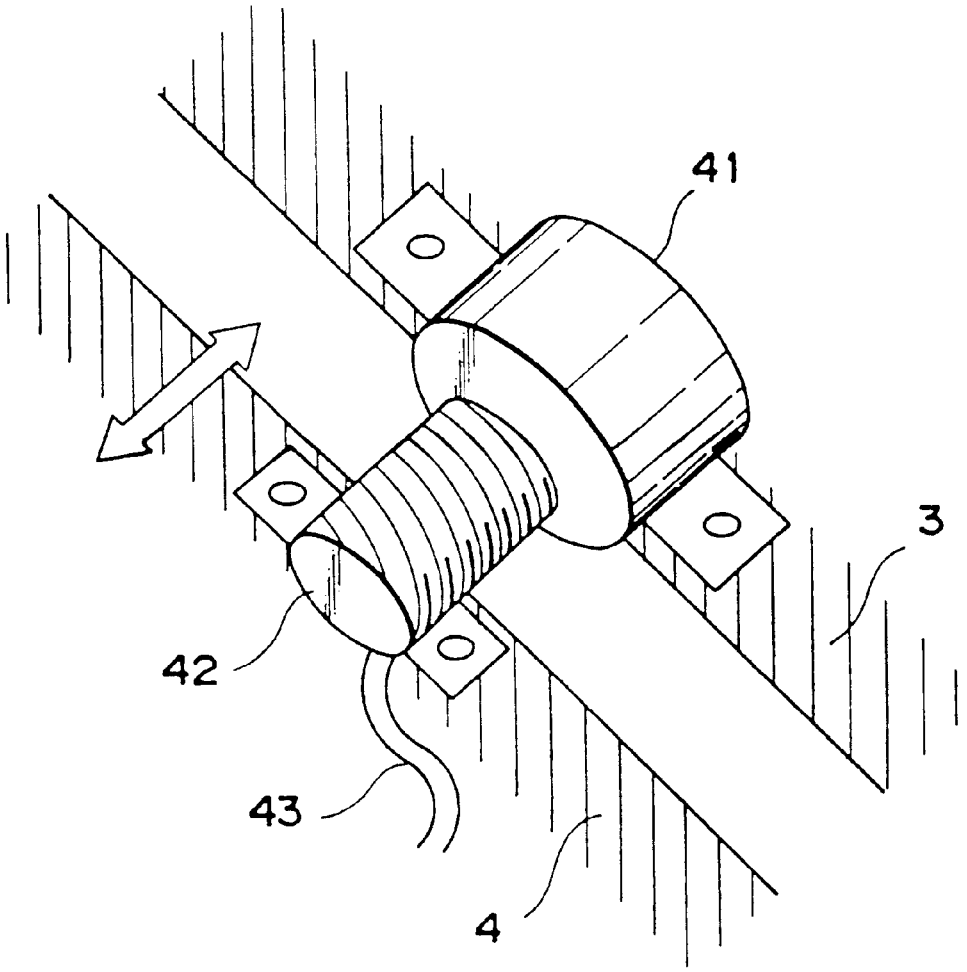
FIG. 5 is a perspective view showing an example of composition of a torque generator system as shown in FIG. 3.

The construction of the above described torque generator system (41, 42, 43) is shown in FIG. 5 as a construction of a voice coil type.

Upon inputting of control signal into an input terminal 43, a magnetic bonding force (or magnetic repelling force) is generated between a voice coil 42 and a magnet 41 corresponding to the amount of electric current and polarity so that a torque may be generated toward the direction of the arrow as shown in FIG. 5.

As described above, the sensor system (30, 31, 32) and the torque generator system (41, 42, 43) are arranged so that the x-axis and the y-axis cross each other perpendicularly, and, together with the gimbals support, they may torque-control the movable support member 3 around the x-axis and y-axis so as to effect centering and damping on the movement of the movable support member 3.

Figure 1:
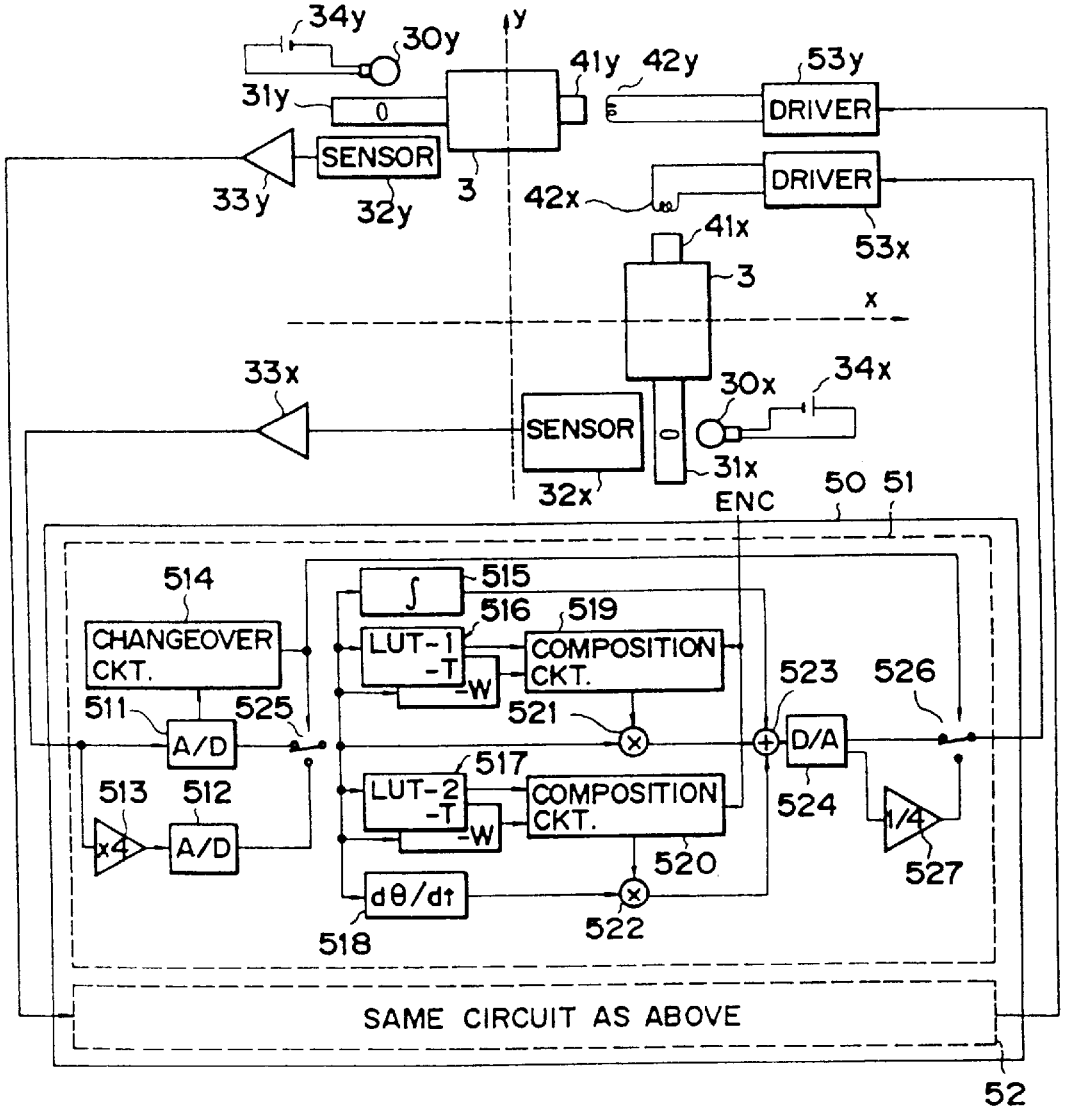
FIG. 1 is a block diagram of an image stabilizing apparatus showing an example of the present invention.

FIG. 1 is a block diagram of an embodiment of the present invention which shows a control system for inputting the output of the above described sensor amplifier 33 and for controlling the drive of the voice coil 42 in accordance with the displaced state of the movable support member 3 in relation to the barrel 4 so as to effect a torque control of the movable support member 3 around the x-axis and y-axis.

Referring to FIG. 1, the displacement signal for the movable support member 3 in relation to the barrel 4 provided from the sensor amplifier 33 for the x-axis and y-axis of the movable support member 3 (the sensor system (including here 33, 34 in addition to 30~32) for the movable support member 3 with respect to the circumference of the x-axis is indicated by 30x, 31x, 32x, 33x, 34x while the sensor system for that with respect to the circumference of the y-axis is indicated by 30y, 31y, 32y, 33y, 34y) is converted into a digital data by an A/D converter 511 or 512 provided in a control circuit 50 constituted for example by a microcomputer and is processed in the control circuit 50.

At this time, for the range in which the amount of displacement (deviation angle) of the movable support member 3 in relation to the barrel 4 is small, i.e., for the range within ¼ from the center of movement (the deviation angle of the movable support member 3 in relation to the barrel 4=0), the output of the sensor amplifier 33 is amplified four times at an amplifier 513 by the operation of a changeover circuit 514 and a signal A/D-converted by the A/D converter 512 is sent to the next stage while, for the range exceeding ¼ where the amount of displacement is comparatively large, the signal A/D-converted by the A/D converter 511 is sent to the next stage. Thus, even though the A/D converter 511 and the A/D converter 512 are identical to each other, it is possible to make the converting accuracy of the A/D converter 512 four times that of the A/D converter 511. The reason for this will be described in more detail with reference to FIG. 2.

Figure 2:
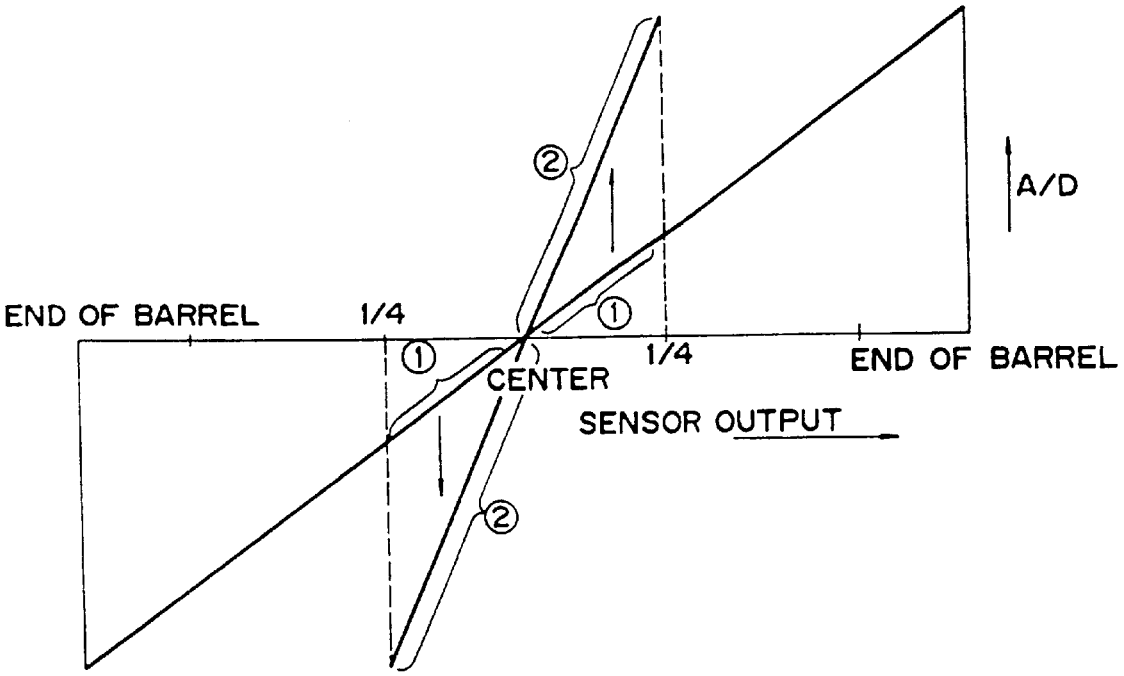
FIG. 2 is a view illustrating the processing of data on deviation angle in the vicinity of the center of movement of the present invention.

Referring to FIG. 2, the horizontal axis indicates the output of the sensor amplifier 33 corresponding to the displacement data from the center of movement while the vertical axis indicates the digital data after the A/D conversion as described above.

Converting into a digital data of which the displacement data from the center of movement is multiplied by four corresponds to changing the conversion characteristic (1) before the amplification to the line indicated by the conversion characteristic (2). In this way, the resolution in the vicinity of the center of movement is increased by four times and the resolution involving a problem due to the limitation of the A/D converter is improved in a simulated manner so that damping and centering operations may be accurately performed by a torque signal based on the resulting signal.

The signal A/D-converted as described above and processed as will be described is converted into an analog data at a D/A converter 524 and is outputted from a control circuit 50. On the basis of such analog data, the torque generator systems 41, 42 (in FIG. 1, those for the circumference of the x-axis of the movable support member 3 are indicated by 41x, 42x while those around the y-axis are indicated by 41y, 42y) are driven and controlled by driver circuits 53x, 53y.

The fundamental idea underlying the control by the control circuit 50 as described is that, in order to satisfy two opposing factors that are the prevention of vibration and the prevention of an excessive movement of the lenses related to panning or tilting, a non-linear control torque for damping and centering is generated at the torque generator systems 41x, 42x and 41y, 42y for the displacement relative to the barrel 4 of the movable support member 3 constituting an inertia pendulum.

Figure 6:
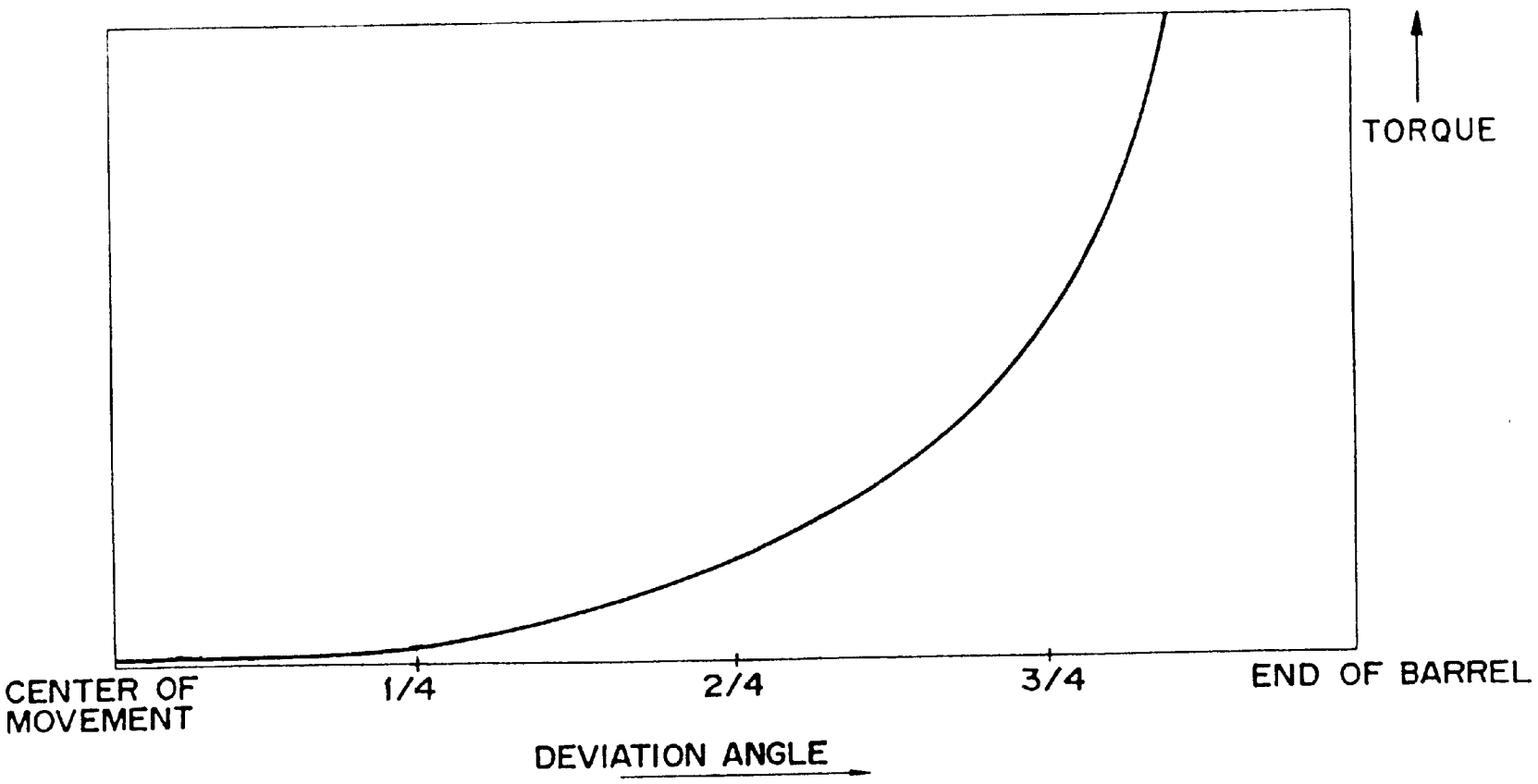
FIG. 6 is a graph showing the characteristic of control torque which underlies the control system as shown in FIG. 1.

Here, FIG. 6 shows an example of the characteristic of control torque when the focal length of the taking optical system is set for telephotographing.

According to the control torque characteristic of FIG. 6, when the movable support member 3 is at near the center of movement, the torque generator systems 41x, 42x and 41y, 42y are almost not at all caused to produce the torque for damping so as not to impede the stabilizing effect by the inertia pendulum.

On the other hand, if the movable support member 3 is considerably displaced from the center of movement by the action of the inertia pendulum when for example the barrel 4 is largely moved toward one direction such as in panning and tilting, the torque generator systems 41x, 42x and 41y, 42y are caused to generate centering and damping forces that increase sharply with an increase in the amount of displacement to bring the movable support member 3 back to the center of movement so that the collision of the movable support member with the inner wall of the barrel 4 may be prevented.

Figure 7:
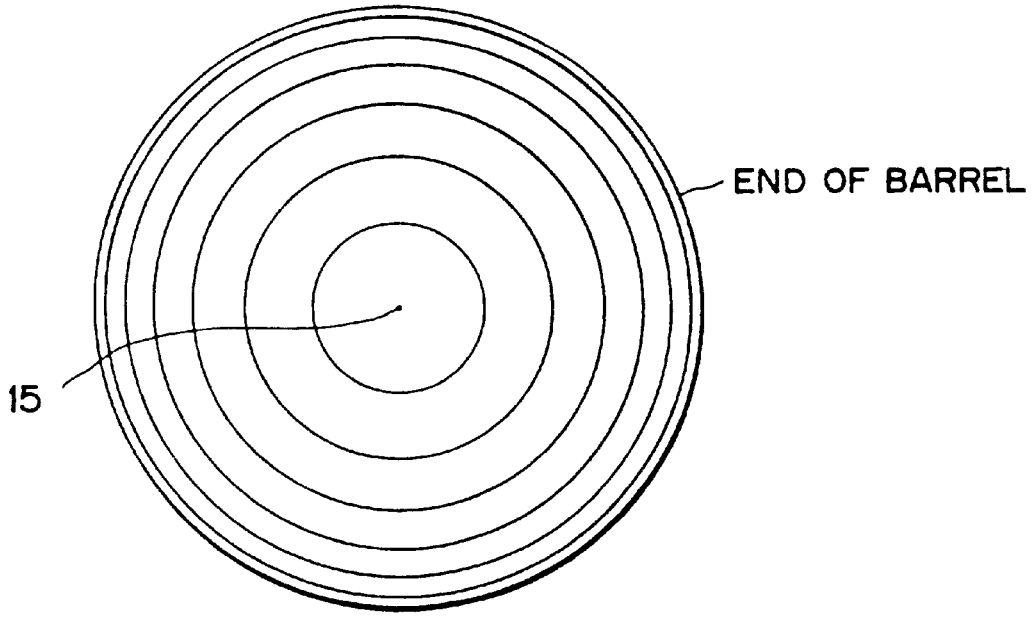
FIG. 7 is a conceptual image explaining the control torque of FIG. 6 as seen from the side of the principal optical axis.

When the torque curve of FIG. 6 is seen from the direction of the principal optical axis 15 of the pendulum, an image such as shown in FIG. 7 is produced. Since each of the concentric circles indicates a fixed amount of change in torque, the distance between the concentric circles is condensed as it comes closer to the outer circumference, i.e., toward the edge of the barrel 4, showing the fact that the inclination of the torque characteristic becomes steeper as the movable support member 3 is displaced further from the center of movement. In other words, what is referred to as non-linear curve in FIG. 6 is depicted to show the manner by which torque rises.

In this way, the torque for centering and damping is controlled so that the collision of movable support member 3 with the inner wall of the barrel 4 may be prevented by intensifying the centering and damping effect when the movable support member has come closer to the barrel 4. For other occasions, such centering and damping effect is controlled to the minimum so as not to impede the stabilizing effect by the inertia pendulum.

To achieve the control characteristic as shown in FIG. 6, coefficients $K_1$, $K_2$ by which the torque curve of FIG. 6, may be obtained in accordance with the amount of displacement (deviation angle θ) of the movable support member 3 which is for example inputted from the sensor amplifiers 33x, 33y are selected at the control circuit 50 from look-up tables 516, 517 (hereinafter referred to as "LUT") which are stored in a memory within the control circuit 50, so as to calculate a control function:

$$DATA=K_1*\theta+K_2*d\theta/dt+K_3*\int\theta dt,$$

where the coefficient $K_3$ is a constant having a small value and "*" indicates a multiplication. This DATA becomes the control torque to be generated by the torque generator systems 41x, 42x and 41y, 42y.

In the above described control function, the term "$K_1*\theta$" may be obtained by the LUT 516, a composition circuit 519 and a multiplier 521 as shown in FIG. 1 and acts as a spring factor which produces a centering force corresponding to the displacement of the movable support member 3 from the center of movement.

The term "$K_2*d\theta/dt$" is a damping factor which may be obtained from the LUT 517, a composition circuit 520, a multiplier 522 and a differentiator 518 as shown in FIG. 1 and has a restraining effect against an abrupt panning and tilting.

The term "$K_3*\int dt$" is for centering to be obtained in an integrator 515 and has the effect of canceling the cumulative error or errors occurring due to various factors such as the manufacturing error at the time of mass production so as to return the movable support member 3 to the center of movement. Since such integrating operation is set to have only a small effect on the control system, a non-linear processing such as effected on the other terms is not performed.

Then each of the terms as described is added at an adder 523, converted into an analog signal again in a D/A converter at the next stage and is outputted directly or by way of an attenuator 527 to the torque generators 42x, 42y. It should be noted that the attenuator 527 is selected by the above described changeover circuit 514 simultaneously with the amplifier 513 when the displacement of the movable support member 3 in relation to the barrel 4 is within the ¼ range and the signal amplified four times by the amplifier 513 is hereby attenuated to ¼ and is outputted.

It should be noted that, since the constructions respectively bounded by broken lines 51, 52 in the control circuit 50 as shown in FIG. 1 are identical to each other with the exception of the data for coefficients in the LUTs 516, 517, the representation of the portion bounded by the broken line 52 is omitted for the purpose of simplification. Also, of the construction bounded by the broken line 51, the portion from the integrator 515 to the adder 523 is a representation in terms of hardware of the processing content of the control circuit 50.

Figure 10:
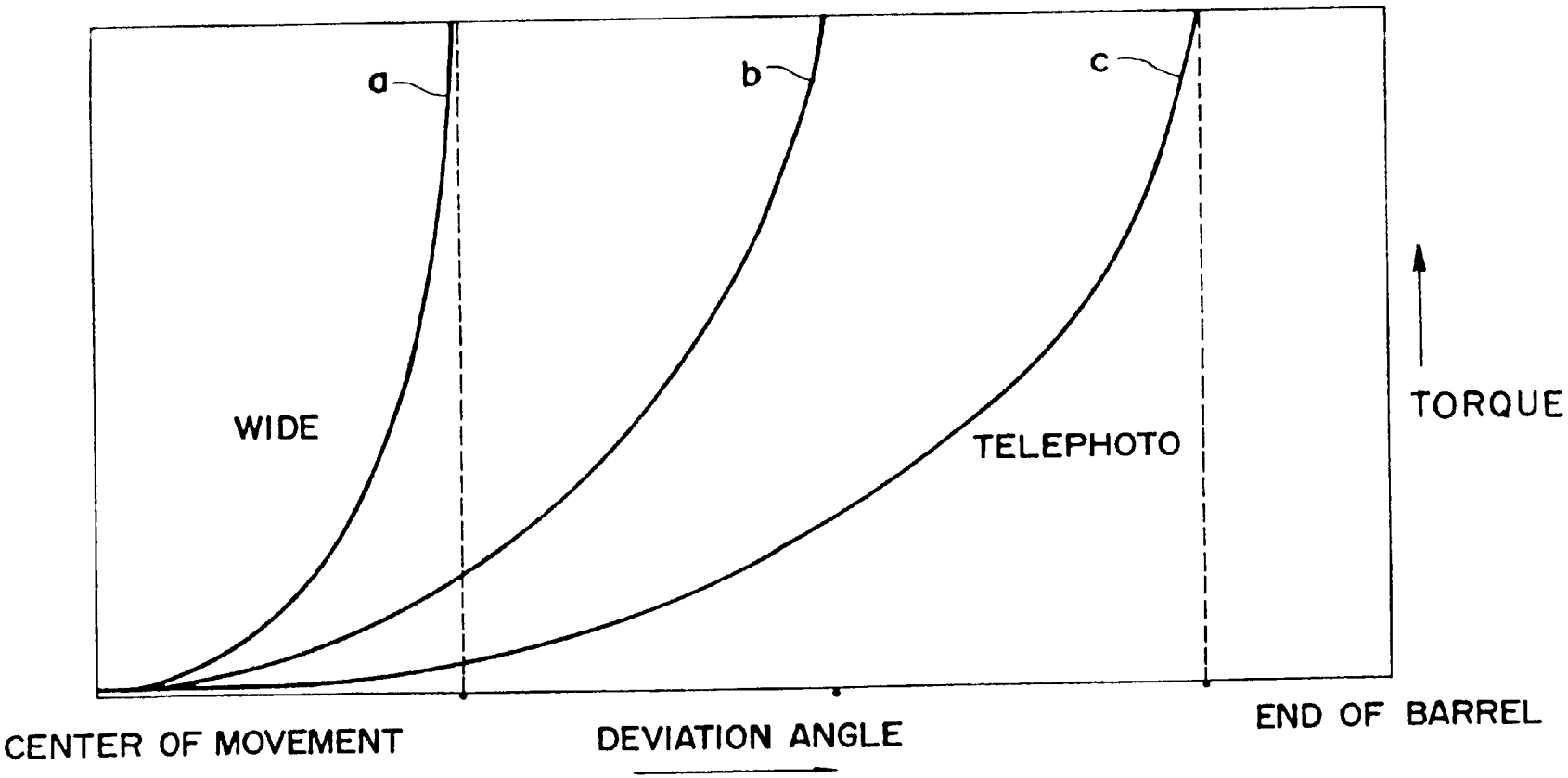
FIG. 10 is a graph showing a characteristic curve of control torque when the characteristic of control torque is changed in accordance with focal length in the same embodiment.

In the present embodiment, providing of the control torque at the time of wide-angle taking is to be more intensified than that at the time of telephoto taking in accordance with the output of the variable magnification encoder (ENC95). FIG. 10 shows one such manner, where the control torque curve is changed in the order of (c)→(b)→(a) so as to obtain a non-linear characteristic by which more intensified torque may be provided as the focal length of the taking optical system is changed from the telephoto (longer focal length) end to the wide-angle (shorter focal length) end.

For this reason, coefficients $K_1$, $K_2$ of the control function corresponding to the deviation angle θ of the movable support member 3 for providing the torque curve (a) at the wide-angle end and coefficients $K_1$, $K_2$ of the control function corresponding to the deviation angle θ of the movable support member 3 for providing the torque curve (c) at the telephoto end are set in the LUTs 516, 517 in the control circuit 50. These coefficients are selected in accordance with the deviation angle θ of the movable support member 3 and composite operation is effected to obtain a torque curve as described above in accordance with the value of the ENC 95 so as to make them as the coefficients $K_1$, $K_2$ of the above described control function.

This is implemental for a relatively large movement such as panning, since it is known that hand vibration is usually more conspicuous in a hand-held taking using a telephoto lens than in a wide-angle taking. The control torque having a negative effect on the stabilization, i.e., the original objective is adjusted to the state at which the optical equipment is used so that the characteristic in taking with a telephoto lens is weakened comparing to that in a wide-angle taking to suit the stabilizing effect.

In this way, a smaller size and lighter weight of the stabilizing optical system as a whole may be achieved without damaging the stabilizing characteristic at near the telephoto end.

In the following, a brief description will be added to this point.

Figure 11A:
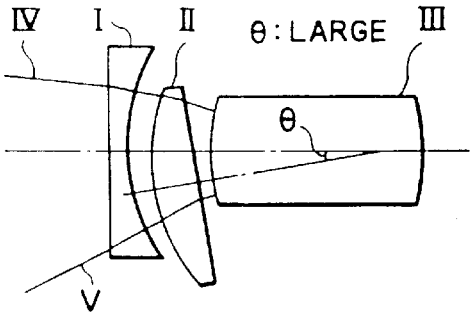
FIGS. 11A and 11B are views showing an optical construction to explain that the apparatus of the present embodiment may be made into a small size.
Figure 11B:
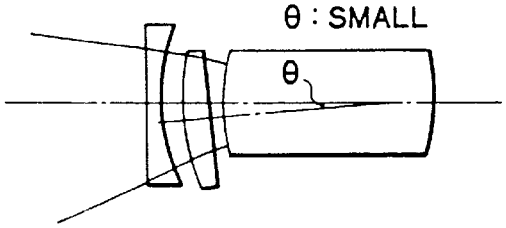

Referring to FIG. 11, "I" and "II" denote a first lens group and second lens group of the correcting optical system similar to the lenses 1, 2 as shown in FIG. 3, respectively, and "III" denotes a principal taking system. Each of "IV" and "V" denotes a ray out of the axis.

Here (A) is the state where the deviation of the second group is relatively large for the purpose of stabilization while (B) is the state where such deviation is small.

Size of each lens in the first lens group and the second lens group of the stabilizing optical system is determined by the height at which the out-of-axis rays IV, V pass through the respective lens system.

Accordingly, as shown in FIG. 11, the size of the optical system may be made smaller when the deviation angle is relatively small because the height at which the out-of-axis rays pass through is lower than that at the time of a relatively large deviation angle.

The out-of-axis ray determining the size of the optical system is usually the ray which forms an image at the maximum image height at the wide-angle end or in the zooming range nearby.

Since the field angle becomes smaller in the vicinity of the telephoto end, a sufficient stabilizing range may be obtained as far as a ray of some degree of deviation angle is secured in the vicinity of the wide-angle end (because a blur of image is not much of a concern at the wide-angle side compared to that at the telephoto side).

Therefore, if the deviation angle, i.e., the control range at the time of stabilizing operation in the vicinity of the wide-angle end is made smaller than that at the telephoto end by using the torque characteristic as shown in FIG. 10, the reduction in size and weight of the stabilizing optical system as a whole may be achieved (FIGS. 11A→11B) without impeding the stabilizing characteristic in the vicinity of the telephoto end.

Operation of the control system as shown in FIG. 1 will now be described with reference to the flowcharts in FIG. 8 and FIG. 9.

"Step 1"—Value in the ENC 9 (ENC data) is read for the detection of focal length.

"Step 2"—Mode "1" is set to "x" for processing to calculate a control torque signal around the x-axis of the movable support member 3.

"Step 3"—The system is set to an LUT select mode j-1 so as to select which one of the LTs storing the coefficients of the control function is to be used.

"Step 4"—An output of the sensor amplifier 33x corresponding to the deviation angle θ (referred to as θx) around the x-axis of the movable support member 3 is read as a digital data from the A/D converter 511 or from the A/D converter 512 which receives the data by way of the amplifier 513.

At this time, the changeover circuit 514 determines how close the movable support member 3 is located toward the barrel 4 from the center of movement on the basis of the A/D-converted data (deviation angle θx) from the output of the A/D converter 511. If it is in the vicinity of the center of movement (within ¼ range), the changeover circuit 514 changes over a switch 525 to the output side of the A/D converter 512 (and also changes over a switch 526 to the output side of the attenuator 527) so that the output of the sensor amplifier 33x is multiplied by four and the A/D-converted digital data is introduced to the next stage On the other hand, if a judgement is made as that the output of the A/D converter 511 indicates the fact that it is beyond the ¼ range, the switch 525 is caused to remain at the output side of the A/D converter 525 (and the switch 526 also remains at the output side of the D/A converter 524) so that a digital data A/D-converted from the output of the sensor amplifier 33x without changing gain is introduced to the next stage.

It should be noted that, the gains at the changing over point of the changeover circuit 514 and at the amplifier 513 at the input stage of the A/D converter 512 are not limited to ¼ and four times as described, and they may be higher or lower. Thus, the above described control may be performed at a required accuracy.

A description will be given below with reference to FIG. 9 which shows the processing at Step 4 in more detail.

"Step 4-1"—Read the data (deviation angle θx) which has been A/D-converted at the A/D converter 511.

"Step 4-2"—It is seen whether deviation angle θx occurs in the vicinity of the center of movement, i.e., within the ¼ range If it does not (in the case of NO). the program proceeds to Step 4-6 while, if it does (in the case of YES), proceeds to Step 4-3.

"Step 4-3"—Switch 525 is changed over in a manner as described to the output side of the A/D converter 512 which receives by way of an amplifier 513.

"Step 4"—Since a data multiplied by four has been read as described, the switch 526 is hereby changed over to the output side the attenuator 527.

"Step 4-5"—Digital data from the A/D converter 512 is set as the deviation angle data and LUT is selected so as to perform subsequent torque calculation.

"Step 4-6"—Digital data from the A/D converter 511 is set as the deviation angle data and LUT is selected so as to effect subsequent torque calculation.

Figure 8:
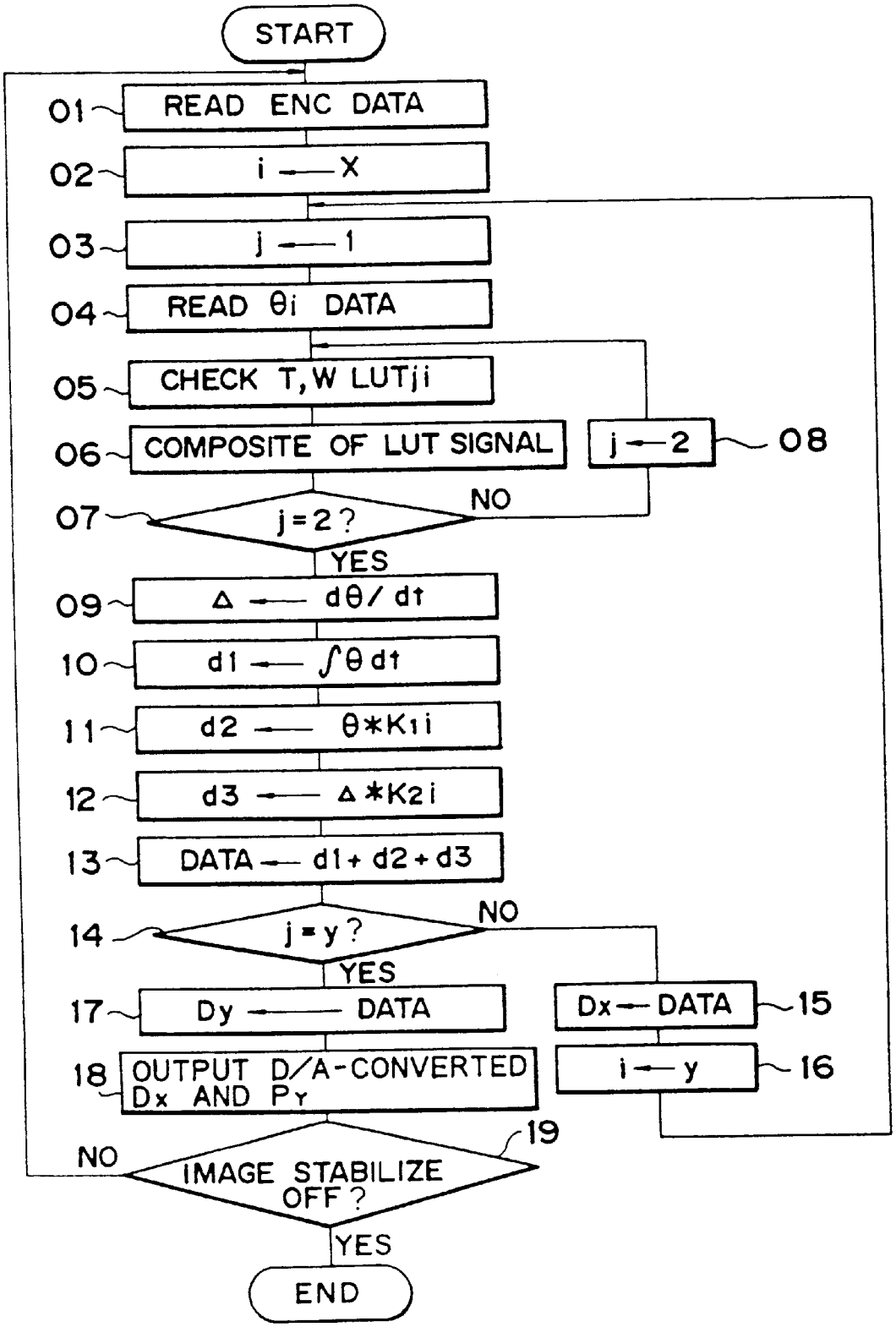
FIGS. 8 and 9 are flowcharts showing the operation of an embodiment of the present invention.
Figure 9:
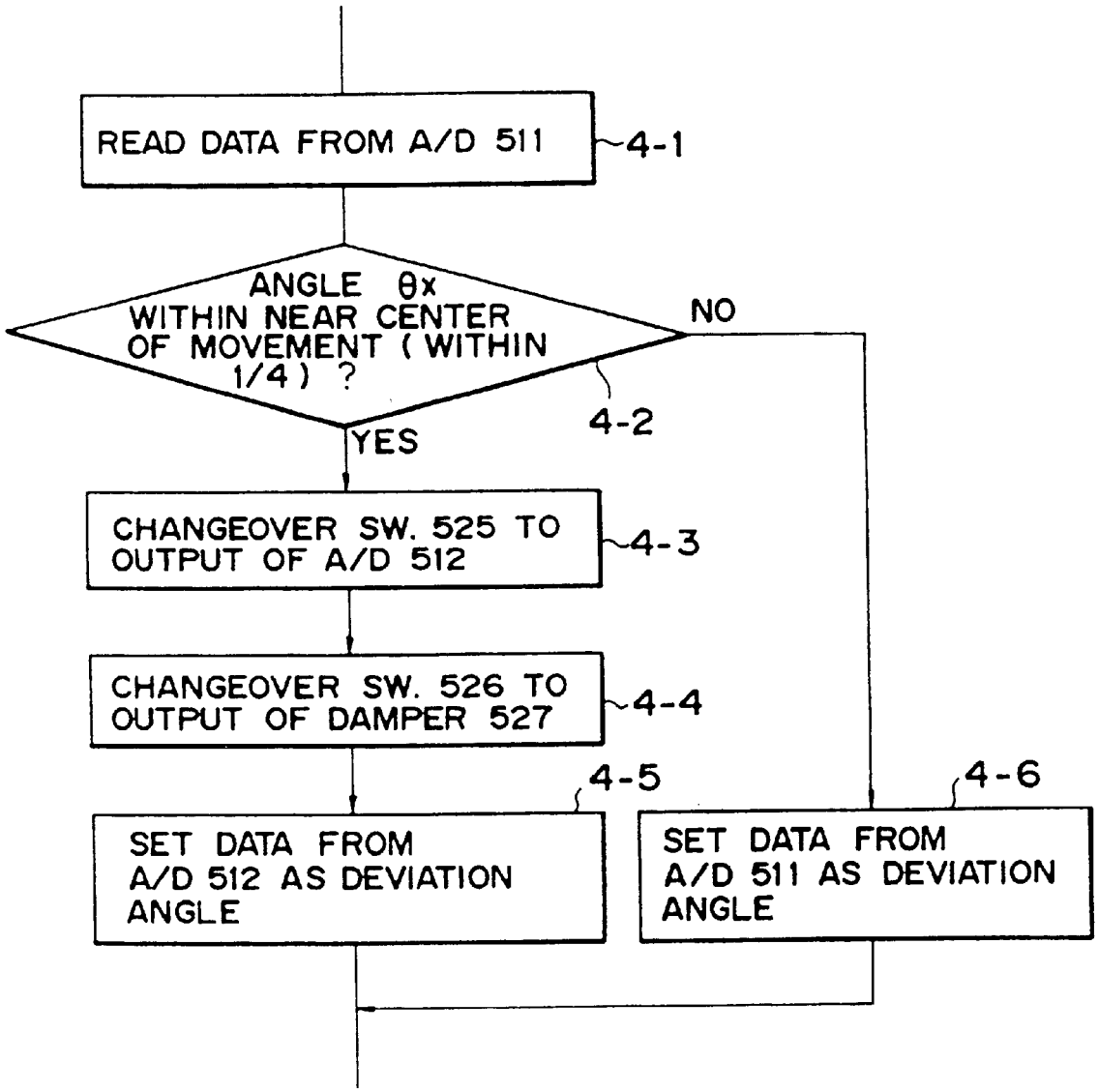

When the processing as described ends, the program returns to Step 5 as shown in FIG. 8, "Step 5"—In accordance with the setting of LUT select mode j=1 at Step 3, coefficients $K_{1W}$ and $K_{1T}$ corresponding to the above described deviation angle θx are read from LUT-1x-W and LUT-1x-T storing the coefficient $K_1$ of the above described control function by which the control torque curve (a) for wide-angle end and control torque (c) for telephoto end as shown in FIG. 10 may be obtained with respect to the x-axis of the movable support member 3.

"Step 6"—Coefficient $K_1$ of the control function for the current focal length is obtained by a composite calculation in accordance with the value in the ENC 95 as described corresponding to the coefficients $K_{1W}$ and $K_{1T}$.

Figure 12:
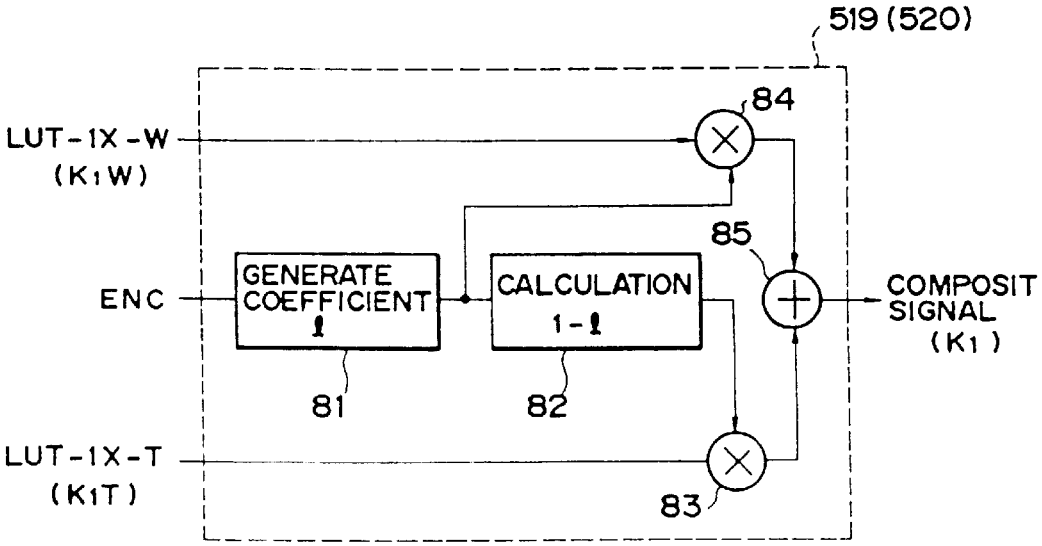
FIG. 12 is a circuit diagram showing an example of the composition circuit as shown in FIG. 1.

An example of such composite calculation in terms of hardware is shown in FIG. 12.

Referring to FIG. 12, the composition circuit 519 (as well as the composition circuit 520) includes a coefficient generator 81 for generating a coefficient l corresponding to the resolution of the ENC 95, a calculator 82 for generating the complement of 1 (1−l), multipliers 84, 83 for calculating "$K_{17}$*l" and "$K_{1W}$*(1−l)" and outputs the coefficient $K_1$ corresponding to the focal length from the adder 85 which adds the outputs of the multipliers.

It is also possible to omit this composition circuit by providing LUTs in the same number as the number of steps (resolution) of the ENC in a manner corresponding to the output of the ENC 95.

"Step 7"—It is verified whether or not processing has been completed by setting LUT select mode j to both 1 and 2. If not completed (j=2), the program proceeds to Step 8.

"Step 8"—Here the program returns to Step 5 by resetting LUT select mode to j=2. In accordance with the setting of LUT select mode j=2, coefficients $K_{2W}$ and $K_{2T}$ corresponding to the above described θx are read from LUT-2x-W and LUT-2x-T storing the above described control function $K_2$ by which the control torque curve (a) for wide-angle end and control torque (c) for telephoto end as shown in FIG. 10 may be obtained with respect to the x-axis of the movable support member 3. Then at Step 6 the coefficient $K_2$ of the above described control function is obtained by the composite calculation as described.

"Step 9"—The above described θx is differentiated (dθx/dt) to obtain a data Δ.

"Step 10"—The above described θx is integrated (∫θxdt) and the result is multiplied by the coefficient $K_3$ so as to obtain a data d1.

This coefficient $K_3$ is set as a constant small value as described so as to lower the effect on the control system, and its non-linear processing such as those effected on the other coefficients $K_1$, $K_2$ is not performed.

"Step 11"—The above described θx is multiplied by the previously obtained coefficient $K_1$ so as to make a data d2.

"Step 12"—The above described data Δ is multiplied by the previously obtained coefficient $K_2$ so as to make a data d3.

"Step 13"—The above described data d1, d2, d3 are added together and the result is temporarily stored as "DATA".

Here, in other words, the calculation result of the above described control function may be obtained as:

$$DATA=d1+d2+d3=K_1*\theta x+K_2*d\theta x/dt+K_3*\int\theta xdt.$$

"Step 14"—It is discriminated whether the current processing mode i is the one related to the x-axis of the movable support member 3.

If the mode is of an odd ordinal number, it is related to the x-axis (in the case of NO) and the program proceeds to Step 15. If the mode is of an even ordinal number, it is related to y (in the case of YES) and the program proceeds to Step 17.

"Step 15"—The calculation result "DATA" is stored in Dx as the control torque data for the x-axis.

"Step 16"—The processing mode i is changed to "y" and the program returns to Step 2 so that processing for the calculation of the control torque signal with respect to the y-axis of the movable support member 3 is performed in a similar manner as in the case of the x-axis as described.

At Step 5 in this case, however, coefficients $K_{1W}$ and $K_{1T}$ corresponding to the deviation angle θ (referred to as θy) with respect to the y-axis of the movable support member 3 are read from LUT-1y-W and LUT-1y-T storing the coefficient $K_1$ of the above described control function by which the control torque curve (a) for wide-angle end and control torque curve (c) for telephoto end as shown in FIG. 10 may be obtained with respect to the y-axis of the movable support member 3. And coefficients $K_{1W}$ and $K_{1T}$ corresponding to the above described deviation angle θy are read from LUT-1y-W and LUT-1y-T storing the coefficient $K_2$ of the above described control function by which the control torque curve (a) for wide-angle end and control torque curve (c) for telephoto end as shown in FIG. 10 may be obtained.

"Step 17"—The calculation result "DATA" is stored in Dy as the control torque data for the y-axis "Step 18"—The control torque data Dx and Dy are converted into analog data by the D/A converter 524, and the results are provided directly or by way of the attenuator 527 to the driver circuits 53x, 53y as the deviation angle data (torque control signal) to as to effect a torque control around the x-axis of the movable support member 3.

"Step 19"—It is judged whether the image stabilizing operation is to be terminated. If it is to be terminated (in the case of YES), the system terminates the series of operations, while, if it is to be continued (in the case of NO), the system returns to Step 1 and the processing as described above is repeated until the end.

In this way, the torque curve of the above described control function may be obtained so as to give a more 50 intensive torque as the focal length is changed from the telephoto side end to the wide-angle side. Thus, a torque for returning the movable support member 3 to the center of movement, having a non-linear characteristic increasing sharply as the movable support member 3 comes closer to the inner wall of the barrel 4 due to such operations as panning and tilting is generated at the torque generator system (41x, 42x) around the x-axis and at the torque generator system (41y, 42y) around the y-axis, thereby the movable support member 3 is returned toward the center of movement. Further, since the output of the sensor amplifier 33 gains by four times in the vicinity of the center of movement for the subsequent processing, it is possible to perform the control over the movable support member 3 at a high accuracy toward the center of movement.

According to the present embodiment, it is judged whether the displacement of the movable support member 3 with respect to the barrel 4 is within the ¼ range from the center of movement. Since, if it is within this range, the output of the sensor amplifier 33 which has been amplified by four times at the amplifier 513 is read for processing as the deviation angle data so as to improve the resolution of the A/D-converted output in the vicinity of the center of movement, the positioning control of the movable support member 3 toward the center of movement may be accurately performed.

In other words, the above described embodiment is provided with an amplifier means for causing a gain in an inputted signal which indicates the magnitude of the relative displacement of the correcting optical system, and a selection means for determining whether a signal gained up by the amplifier means is used or a signal not gained up is used, in accordance with a judged magnitude in relation to a predetermined value of the relative displacement of the correcting optical system with respect to the barrel when a signal for producing an acting force is generated. Since the signal gained up by the amplifier means is thus used in the vicinity of the center of movement where the relative displacement of the correcting optical system with respect to the barrel is smaller than the predetermined value so as to generate a signal for producing an acting force with a high resolution, it is possible to improve the control ability over the relative displacement of the correcting optical system with respect to the barrel especially in the vicinity of the center of movement.

It should be noted that, while in the above described embodiment the signal for a position in the vicinity of the center of movement is amplified, signals for other positions may also be amplified as required.

Further, the present invention is not limited to the above described embodiment, and as a matter of course the present invention may also be applied for example to any type of image stabilizing apparatus.

*By way of introduction to the ensuing claims, detection means for detecting the relative displacement of the correcting optical means in relation to the lens barrel in the operational range of displacement corresponds to sensor 32x and amplifier 33x. Circuit means for processing the output of the detection means with different amplification decrees upon detection by the detection means of respective different relative displacements in the operational range of displacement corresponds to circuit elements 511, 512 and 513.*

*Circuit elements 514 and 525 correspond to selection means for selecting applicable amplification decrees for said circuit means responsively to relative displacements detected by said detection means. The selection means is*

*indicated as selecting the applicable amplification degrees so that said circuit means changes outputs of the detection means which are of different amplitudes into outputs of the circuit means which are same amplitude signals. As is seen in FIG. 2, wherein circled numerals 1 and 2 are lines indicative of the respective amplification degrees, any horizontally drawn line intersecting both lines, arising from corresponding barrel positions in the lineally successive wide angle and telephoto ranges, provide the same A/D signal.*

*Otherwise viewed, circuit elements 511, 512 and 513, together with circuit elements 514 and 525, constitute an input device which inputs signals relating to shake or displacement and outputs signals which vary in accordance with variation of the signals relating to shake or displacement, the input device inputting a first input signal as one signal relating to shake or displacement and outputting a first output signal as one output signal by applying a first signal processing to the first input signal. Further, the input device inputs a second input signal different from the first input signal as a second signal relating to shake or displacement and outputs the first output signal as a second output signal by applying a second signal processing to said second input signal relating to shake or displacement. There result respective high and low resolutions in devices in accordance with the invention.*

*Devices of the invention are further characterized in having signal forming devices to apply respective different signal processings to output signals of the input device in accordance with the type of input signal. Referring to FIG. 1, the output of D/A converter 524 is either processed directly as the analog signal thus provided or is multiplied by ¼ in circuit 527, dependently on the state of switch 526, which is set by changeover circuit 514 dependently on the the of input signal relating to shake or displacement.*

*Where multiplication by circuit element 513 is selected for an input signal, as one signal processing, the output signal resulting from the one signal processing, is subjected to division by circuit element 527, which is selected as another signal processing for the output signal of the input device. To the extent that the processings are respectively reverse to one another, circuit element 527 is a reverse means.*

*Circuit elements 515 through 526 constitute a signal forming device (or a determination device) which receives the signals output by the input device and forms a signal used to prevent the image shake or makes a determination as respects image shake and its prevention.*

*Further, per the input device of the invention, a first input signal at a first level gives rise to a first output signal at a first output level and a second input signal at a second level different from the first level gives rise to a second output signal which is the first output signal, i.e., is at the same level. Per the signal forming device, upon input of the first input signal to the input device, the first output signal at the first level is brought to a third signal, and upon input of the second input signal to the input device, the second output signal which is the same as the first output signal, is brought to a fourth signal, which is different from the third signal.*

*Further, the invention provides an apparatus for controlling a fluctuation generated at a device, comprising a signal generator (32X, 33X: FIG. 1) for generating first and second signals representative of first magnitude and second magnitude relating to the fluctuation, a signal processing circuit (511–513, 524, 527, FIG. 1) having high resolution and low resolution functions and for providing a control signal to control the fluctuation in response to the first and second signals, a circuit (514, 525, 526: FIG. 1) for, responsive to the first and second signals, changing over the resolution of said processing circuit, and a control circuit (53X, 42X: FIG. 1) for controlling the fluctuation in response to the control signal.*

We claim:

1. An image stabilizing apparatus for correcting a blur of image by using correcting optical means supported in a manner capable of relative displacement in relation to a lens-barrel in an operational range of displacement of said correcting optical means, said image stabilizing apparatus comprising:

(A) detection means for detecting the relative displacement of the correcting optical means in relation to the lens-barrel in said operational range of displacement;

(B) circuit means for processing the output of the detection means with different amplification degrees upon detection by said detection means of respective different relative displacements in said operational range of displacement; [and]

(C) selection means for selecting applicable amplification degrees for said circuit means responsively to relative displacements detected by said detection means*; and*

(*D*) *reverse means for processing an output of said circuit means with a reverse amplification degree given by said circuit means*.

2. The apparatus according to claim 1, wherein said circuit means includes amplifier means for increasing amplification degree in response to said correcting optical means becoming displaced close to a center of said lens-barrel.

3. The apparatus according to claim 1 further comprising driving means for driving said correcting optical means in response to an output of said circuit means.

4. The apparatus according to claim 3, wherein said driving means includes calculation means for performing a calculation to control driving of a driving member of said driving means in response to the output of said circuit means.

5. The apparatus according to claim 4, wherein said driving means includes attenuation means for attenuating a calculation result of said calculation means in accordance with the amplification degree of said circuit means.

6. The apparatus according to claim 3, wherein said driving means includes attenuation means for attenuating driving power of said driving means in accordance with the amplification degree of said circuit means.

7. The apparatus according to claim 4, wherein said calculation means changes [in] *an* algorithm for calculation therein in accordance with the output of said circuit means.

8. The apparatus according to claim 1, wherein said driving means changes a driving pattern of said correcting optical means in accordance with the output of said circuit means.

9. An optical apparatus, comprising:

(a) correcting optical means for correcting a blur of an image;

(b) a supporting member for supporting said correcting optical means in a manner capable of relative displacement in relation to said supporting member in an operational range of displacement of said correcting optical means;

(c) detection means for detecting the relative displacement of said correcting optical means in relation to the supporting member in said operational range of displacement;

(d) circuit means for processing the output of the detecting means with different amplification degrees upon detection by said detection means of respective different relative displacements in said operational range of displacement; [and]

(e) selection means for selecting applicable amplification degrees for said circuit means responsively to relative displacements detected by said detection means*; and*

(*e*) *reverse means for processing an output of said circuit means with a reverse amplification decree given by said circuit means.*

10. The apparatus according to claim 9, wherein said circuit means includes amplifier means for increasing amplification degree in response to said correcting optical means becoming displaced close to a portion substantially centrally of said operational range of displacement.

11. The apparatus according to claim 9, further comprising driving means for driving said correcting optical means in response to an output of said circuit means.

12. The apparatus according to claim 11, wherein said driving means includes calculation means for performing a calculation to control driving of a driving member of said driving means in response to an output of said circuit means.

13. The apparatus according to claim 11, wherein said driving means changes a driving pattern of said correcting optical means in accordance with an output of said circuit means.

14. The apparatus according to claim 12, wherein said calculation means changes an algorithm for calculation therein in accordance with the output of said circuit means.

*15. An apparatus adapted for use with optical correcting means to effect image shake prevention in accordance with a signal relating to shake, comprising:*

*an input device which inputs a first input signal relating to shake and outputs a first output signal, and inputs a second input signal different from said first input signal relating to shake and outputs said first output signal as a second output signal; and*

*a signal forming device which receives an output signal from said input device and forms a signal to be used for the image shake prevention said signal forming device bringing said first output signal to a third signal when said input device inputs said first input signal, and bringing said second output signal to a fourth signal which is different from said third signal when said input device inputs said second input signal.*

*16. An apparatus according to claim 15, wherein said input device comprises means for, when said first input signal relating to shake is input at a first input level, providing said first output signal at a first output level, and when said second input signal relating to shake is input at a second input level which is different from said first input level, providing said first output signal at said first output level, and said signal forming device comprises means for bringing the first output signal at said first output level to a third signal at a third level when the input device inputs the first input signal, and bringing the second output signal at said second input level to a fourth signal at a fourth level which is different from said third level when said input device inputs the second input signal.*

*17. An apparatus according to claim 15, wherein said input device comprises first processing means for bringing said first input signal to said first output signal by applying a first signal processing, and second processing means for bringing said second input signal to said first output signal by applying a second signal processing which is different from said first signal processing.*

*18. An apparatus according to claim 17, wherein said input device comprises a selection means for selecting that said first signal processing is applied in accordance with input of said first input signal and for selecting that said second signal processing is applied in accordance with input of said second input signal.*

*19. An apparatus according to claim 15, 17 or 18 wherein said signal forming device comprises third processing means for bringing said first output signal to said third signal by applying a third signal processing, and fourth processing means for bringing said first output signal to said fourth signal by applying a fourth signal processing which is different from said third signal processing.*

*20. An apparatus according to claim 19, wherein said signal forming device comprises means for selecting that said third processing means is applied in accordance with input of said first input signal to said input device and for selecting that said fourth processing means is applied in accordance with input of said second input signal to said input device.*

*21. An apparatus according to claim 15, wherein said input device comprises means for inputting signals corresponding to operating states of an image shake prevention device as said first and second input signals.*

*22. An apparatus according to claim 21, wherein said image shake prevention device comprises a movable unit for preventing the image shake and said input device comprises input means for inputting signals corresponding to operation states of said movable unit as said first and second input signals.*

*23. An apparatus according to claim 21, wherein said image shake prevention device comprises a movable unit for preventing the image shake and said input device comprises input means for inputting signals corresponding to displacement of said movable unit as said first and second input signals.*

*24. An apparatus according to claim 21, wherein said image shake prevention device comprises means for optically preventing image shake.*

*25. An apparatus according to claim 15, wherein said signal forming device comprises means for forming a signal for controlling an image shake prevention device of said optical correcting means.*

*26. An apparatus according to claim 25, wherein said image shake prevention device comprises means for optically preventing image shake.*

*27. An apparatus adapted for image shake prevention in accordance with a signal relating to shake, comprising:*

*an input device which inputs a first input signal relating to shake and outputs a first output signal, and inputs a second input signal different from said first input signal relating to shake and outputs said first output signal as a second output signal;*

*a signal forming device which receives an output signal from said input device and forms a signal to be used for the shake prevention, said signal forming device bringing said first output signal to a third signal when said input device inputs said first input signal, and bringing said second output signal to a fourth signal which is different from said third signal when said input device inputs said second input signal; and*

*optical correcting means including an image shake prevention device for preventing image shake in accordance with the signal formed by said signal forming device.*

*28. An apparatus according to claim 27, wherein said input device comprises means for, when said first input signal relating to shake is input at a first input level, providing said first output signal at a first output level, and*

*when said second input signal relating to shake is input at a second input level which is different from said first input level, providing said first output signal at said first output level, and said signal forming device comprises means for bringing the first output signal at said first output level to a third signal at a third level when the input device inputs the first input signal, and bringing the first output signal at said first output level to a fourth signal at a fourth level which is different from said third level when said input device inputs the second input signal.*

*29. An apparatus according to claim 27, wherein said input device comprises first processing means for bringing said first input signal to said first output signal by applying a first signal processing, and second processing means for bringing said second input signal to said first output signal by applying a second signal processing which is different from said first signal processing.*

*30. An apparatus according to claim 29, wherein said input device comprises means for selecting that said first signal processing is applied in accordance with input of said first input signal and for selecting that said second signal processing is applied in accordance with input of said second input signal.*

*31. An apparatus according to claim 27, 29 or 30 wherein said signal forming device comprises third processing means for bringing said first output signal to said third signal by applying a third signal processing, and fourth processing means for bringing said first output signal to said fourth signal by applying a fourth signal processing which is different from said third signal processing.*

*32. An apparatus according to claim 31, wherein said signal forming device comprises means for selecting that said third processing means is applied in accordance with input of said first input signal to said input device and for selecting that said fourth processing means is applied in accordance with input of said second input signal to said input device.*

*33. An apparatus for use with optical correcting means having an image shake prevention device for performing an image shake prevention in accordance with signals relating to shake, comprising:*

*an input device which inputs a first input signal relating to shake and outputs a first output signal, and inputs a second input signal different from said first input signal relating to shake and outputs said first output signal as a second output signal; and*

*a signal forming device which receives an output signal from said input device and forms a signal to be used for shake prevention, said signal forming device bringing said first output signal to a third signal when said input device inputs said first input signal, and bringing said second output signal to a fourth signal which is different from said third signal when said input device inputs said second input signal.*

*34. An apparatus according to claim 33, wherein said input device comprises means for, when said first input signal relating to shake is input at a first input level, providing said first output signal at a first output level, and when said second input signal relating to shake is input at a second input level which is different from said first input level, providing said first output signal at said first output level, and said signal forming device comprises means for bringing the first output signal at said first output level to a third signal at a third level when the input device inputs the first input signal, and bringing the first output signal at said first output level to a fourth signal at a fourth level which is different from said third level when said input device inputs the second input signal.*

*35. An apparatus according to claim 33, wherein said input device comprises first processing means for bringing said first input signal to said first output signal by applying a first signal processing, and second processing means for bringing said second input signal to said first output signal by applying a second signal processing which is different from said first signal processing.*

*36. An apparatus according to claim 35, wherein said input device comprises means for selecting that said first signal processing is applied in accordance with input of said first input signal and for selecting that said second signal processing is applied in accordance with input of said second input signal.*

*37. An apparatus according to claim 33, 35 or 36 wherein said signal forming device comprises third processing means for bringing said first output signal to said third signal by applying a third signal processing, and second processing means for bringing said first output signal to said fourth signal by applying a fourth signal processing which is different from said third signal processing.*

*38. An apparatus according to claim 37, wherein said signal forming device comprises means for selecting that said third processing means is applied in accordance with input of said first input signal to said input device and for selecting that said fourth processing means is applied in accordance with input of said second input signal to said input device.*

*39. An apparatus adapted for use with optical correcting means to effect image shake prevention in accordance with a signal relating to shake, comprising:*

*an input device which inputs a first input signal relating to shake and outputs a first output signal, and inputs a second input signal different, from said first input signal relating to shake and outputs said first output signal as a second output signal and*

*a signal forming device which receives an output signal from said input device and forms a signal to be used for the image shake prevention, said signal forming device applying different signal processings to said first output signal from said input device respectively when said input device inputs said first input signal and when said input device inputs said second input signal.*

*40. An apparatus according to claim 39, wherein said signal forming device comprises means for applying different signal processings to said first output signal from said input device respectively when said input device inputs said first input signal at a first level and when said input device inputs said second input signal at a second level different from said first level.*

*41. An apparatus according to claim 39, wherein said input device comprises first processing means for bringing said first input signal to said first output signal by applying a first signal processing, and second processing means for bringing said second input signal to said first output signal by applying a second signal processing which is different from said first signal processing.*

*42. An apparatus according to claim 41, wherein said input device comprises means for selecting that said first signal processing is applied in accordance with input of said first input signal and for selecting that said second signal processing is applied in accordance with input of said second input signal.*

*43. An apparatus according to claim 39, 41 or 42 wherein said signal forming device comprises third processing means for bringing said first output signal to a third signal by applying a third signal processing, and fourth processing means for bringing said first output signal to a fourth signal*

*by at lying a fourth signal processing which is different from said third signal processing.*

*44. An apparatus according to claim 43, wherein said signal forming device comprises means for selecting that said third processing means is applied in accordance with input of said first input signal to said input device and for selecting that said fourth processing means is applied in accordance with input of said second input signal to said input device.*

*45. An apparatus adapted for image shake prevention in accordance with a signal relating shake, comprising:*

*an input device which inputs a first input signal relating to shake and outputs a first output signal, and inputs a second input signal different from said first input signal relating to shake and outputs said first output signal as a second output signal;*

*a signal forming device which receives the output signal from said input device and forms a signal to be used for the shake prevention, said signal forming device applying different signal processings to said first output signal from said input device respectively when said input device inputs said first input signal and when said input device inputs said second input signal; and*

*optical correcting means including an image shake prevention device which prevents the image shake in accordance with the signal formed by said signal forming device.*

*46. An apparatus according to claim 45, wherein said signal forming device comprises means for applying different signal processings to said first output signal from said input device respectively when said input device inputs said first input signal at a first level and when said input device inputs said second input signal at a second level different from said first level.*

*47. An apparatus according to claim 45, wherein said input device comprises first processing means for bringing said first input signal to said first output signal by applying a first signal processing, and second processing means for bringing said second input signal to said first output signal by applying a second signal processing which is different from said first signal processing.*

*48. An apparatus according to claim 47, wherein said input device comprises means for selecting that said first signal processing is applied in accordance with input of said first input signal and for selecting that said second signal processing is applied in accordance with input of said second input signal.*

*49. An apparatus according to claim 45, 47 or 48 wherein said signal forming device comprises third processing means for bringing said first output signal to a third signal by applying a third signal processing, and second processing means for bringing said first output signal to a fourth signal by applying a fourth signal processing which is different from said third signal processing.*

*50. An apparatus according to claim 49, wherein said signal forming device comprises means for selecting that said third processing means is applied in accordance with input of said first input signal to said input device and for selecting that said fourth processing means is applied in accordance with input of said second input signal to said input device.*

*51. An apparatus for use with optical correcting means having an image shake prevention device for performing an image shake prevention in accordance with a signal relating to shake, comprising:*

*an input device which inputs a first input signal relating to shake and outputs a first output signal, and inputs a second input signal different from said first input signal relating to shake and outputs said first output signal as a second output signal; and*

*a signal forming device which receives an output signal from said input device and forms a signal to be used for the shake prevention, said signal forming device applying different signal processings to output signals from said input device respectively when said input device inputs said first input signal and when said input device inputs said second input signal.*

*52. An apparatus according to claim 51, wherein said signal forming device comprises means for applying different signal processings to said first output signal from said input device respectively when said input device inputs said first input signal at a first level and when said input device inputs said second input signal at a second level different from said first level.*

*53. An apparatus according to claim 51, wherein said input device comprises first processing means for bringing said first input signal to said first output signal by applying a first signal processing, and second processing means for bringing said second input signal to said first output signal by applying a second signal processing which is different from said first signal processing.*

*54. An apparatus according to claim 53, wherein said input device comprises means for selecting that said first signal processing is applied in accordance with input of said first input signal and for selecting that said second signal processing is applied in accordance with input of said second input signal.*

*55. An apparatus according to claim 51, 53 or 54 wherein said signal forming device comprises third processing means for bringing said first output signal to a third signal by applying a third signal processing, and fourth processing means for bringing said first output signal to a fourth signal by applying a fourth signal processing which is different from said third signal processing.*

*56. An apparatus according to claim 55, wherein said signal forming device comprises means for selecting that said third processing means is applied in accordance with input of said first input signal to said input device and for selecting that said fourth processing means in accordance with input of said second input signal to said input device.*

*57. An apparatus adapted for use with optical correcting means to effect image shake prevention in accordance with a signal relating to shake, comprising:*

*an input device which inputs said signal relating to shake and applies to said signal relating to shake a first signal processing or a second signal processing which is different from said first signal processing; and*

*a signal forming device which receives an output signal from said input device and forms a signal to be used for the image shake prevention, said signal forming device applying to said output signal to which said second signal processing has been applied a third signal processing which is reverse to said second signal processing.*

*58. An apparatus according to claim 57, wherein said input device comprises means for varying a signal level of said signal relating to shake as said second signal processing.*

*59. An apparatus according to claim 57 or 58, wherein said signal forming device comprises means for, as said third signal processing, changing a signal level of said output signal which has been varied by said second signal processing reversely to said second signal processing.*

*60. An apparatus adapted for image shake prevention in accordance with a signal relating to shake, comprising:*

*an input device which inputs said signal relating to shake and applies to said signal relating to shake a first signal processing or a second signal processing which is different from said first signal processing;*

*a signal forming device which receives an output signal from said input device and forms a signal to be used for the image shake prevention, said signal forming device applying to said output signal to which said signal processing has been applied a third signal processing which is reverse to said second signal processing; and*

*optical correcting means including an image shake prevention device for preventing the image shake in accordance with the signal formed by said signal forming device.*

*61. An apparatus according to claim 60, wherein said input device comprises means for varying a signal level of said signal relating to shake as said second signal processing.*

*62. An apparatus according to claim 60 or 61, wherein said signal forming device comprises means for, as said third signal processing, changing a signal level of said output signal which has been varied by said second signal processing reversely to said second signal processing.*

*63. An apparatus for use with optical correcting means having an image shake prevention device for performing an image shake prevention in accordance with signals relating to shake, comprising:*

*an input device which inputs said signals relating to shake and applies to said signals relating to shake a first signal processing or a second signal processing which is different from said first signal processing; and*

*a signal forming device which receives an output signal from said input device and forms a signal to be used for the image shake prevention, said signal forming device applying to said output signal to which said second signal processing has been applied a third signal processing which is reverse to said second signal processing.*

*64. An apparatus according to claim 63, wherein said input device comprises means for varying a signal level of said signal relating to shake as said second signal processing.*

*65. An apparatus according to claim 63 or 64, wherein said signal forming device comprises means for, as said third signal processing, changing a signal level of said output signal which has been varied by said second signal processing reversely to said second signal processing.*

*66. An apparatus for use with optical correcting means for correcting image shake, comprising:*

*an input device which inputs a first input signal relating to displacement and outputs a first output signal, and inputs a second input signal different from said first input signal relating to the displacement and outputs said first output signal as a second output signal; and*

*a determination device which receives an output signal from said input device and determines a state of the displacement, said determination device bringing said first output signal to a third signal when said input device inputs said first input signal and bringing said first output signal to a fourth signal which is different from said third signal when said input device inputs said second input signal.*

*67. An apparatus according to claim 66, wherein said input device comprises means for, when said first input signal relating to displacement is input at a first input level, providing said first output signal at a first output level, and when said second input signal relating to displacement is input at a second input level which is different from said first input level, providing said first output signal at said first output level, and said determination device comprises means for bringing the first output signal at said first output level to a third signal at a third level when the input device inputs the first input signal, and bringing the first output signal at said at said first output level to a fourth signal at a fourth level which is different from said third level when said input device inputs the second input signal.*

*68. An apparatus according to claim 66, wherein said input device comprises first processing means for bringing said first input signal to said first output signal by applying a first signal processing, and second processing means for bringing said second input signal to said first output signal by applying a second signal processing which is different from said first signal processing.*

*69. An apparatus according to claim 68, wherein said input device comprises means for selecting that said first signal processing is applied in accordance with input of said first input signal and for selecting that said second signal processing is applied in accordance with input of said second input signal.*

*70. An apparatus according to claim 66, 68 or 69 wherein said determination device comprises third processing means for bringing said first output signal to said third signal by applying a third signal processing, and fourth processing means for bringing said first output signal to said fourth signal by applying a fourth signal processing which is different from said third signal processing.*

*71. An apparatus according to claim 70, wherein said determination device comprises means for selecting that said third processing means is applied in accordance with input of said first input signal to said input device and for selecting that said fourth processing means is applied in accordance with input of said second input signal to said input device.*

*72. An apparatus for use with optical correcting means for correcting image shake, comprising:*

*an input device which inputs a first input signal relating to displacement and outputs a first output signal, and inputs a second input signal different from said first input signal relating to displacement and outputs said first output signal as a second output signal; and*

*a determination device which receives an output signal from said input device and determines a state of the displacement, said determination device applying to said first output signal from said input device different signal processings respectively when said input device inputs said first input signal and when said input device inputs said second input signal.*

*73. An apparatus according to claim 72, wherein said input device comprises means for, when said first input signal relating to displacement is input at a first input level, providing said first output signal at a first output level, and when said second input signal relating to displacement is input at a second input level which is different from said first input level, providing said first output signal at said first output level, and said determination device comprises means for bringing the first output signal at said first output level to a third signal at a third level when the input device inputs the first input signal, and bringing the first output signal at said first output level to a fourth signal at a fourth level which is different from said third level when said input device inputs the second input signal.*

*74. An apparatus according to claim 72, wherein said input device comprises first processing means for bringing*

*said first input signal to said first output signal by applying a first signal processing, and second processing means for bringing said second input signal to said first output signal by applying a second signal processing which is different from said first signal processing.*

*75. An apparatus according to claim 73, wherein said input device comprises a selection means for selecting that said first signal processing is applied in accordance with input of said first input signal and for selecting that said second signal processing is applied in accordance with input of said second input signal.*

*76. An apparatus according to claim 72, 74 or 75 wherein said determination device comprises third processing means for bringing said first output signal to a third signal by applying a third signal processing, and fourth processing means for bringing said first output signal to said fourth signal by applying a fourth signal processing which is different from said third signal processing.*

*77. An apparatus according to claim 76, wherein said determination device comprises means for selecting that said third processing means is applied in accordance with input of said first input signal to said input device and for selecting that said fourth processing means is applied in accordance with input of said second input signal to said input device.*

*78. An apparatus, for use with optical correcting means for correcting image shake comprising:*

*an input device which inputs a signal relating to displacement and applies to said signal relating to displacement a first signal processing or a second signal processing different from said first signal processing; and*

*a determination device which receives an output signal from said input device and determines a state of the displacement, said determination device applying to said output signal to which said second signal processing has been applied a third signal processing which is reverse to said second signal processing.*

*79. An apparatus according to claim 78, wherein said input device comprises means for varying a signal level of said signal relating to displacement as said second signal processing.*

*80. An apparatus according to claim 78 or 79, wherein said signal forming device comprises means for, as said third signal processing, changing a signal level of said output signal which has been varied by said second signal processing reversely to said second signal processing.*

*81. An apparatus for use with optical correcting means for correcting image shake, comprising:*

*(a) a signal generator for generating first and second signals representative of first magnitude and second magnitude relating to the fluctuation;*

*(b) a signal processing circuit having high resolution and low resolution functions and for providing a control signal to control said fluctuation in response to said first and second signals;*

*(c) a circuit for, responsive to said first and second signals, changing over the resolution of said processing circuit; and*

*(d) a control circuit for controlling said fluctuation in response to said control signal.*

* * * * *

UNITED STATES PATENT AND TRADEMARK OFFICE

CERTIFICATE OF CORRECTION

PATENT NO. : RE 36,578
DATED : February 22, 2000
INVENTOR(S) : Takashi Kobayashi et al.

It is certified that error appears in the above-identified patent and that said Letters Patent is hereby corrected as shown below:

Column 9,
Line 42, delete “LT’s” and insert -- LUT’s --.

Column 10,
Line 19, delete “Step 4” and insert -- Step 4-4 --.
Line 46, delete “coefficient l” and insert -- coefficent ℓ --.
Line 48, delete “1 (1-1)” and insert -- 1 (1-ℓ) --.
Line 49, delete “$K_{iw}$(1-1)” and insert -- $K_{iw}$(1-ℓ) --.
Line 49, delete “$K_{17}$*1” and insert -- $K_{IT}$*ℓ --.

Column 11,
Line 53, delete “y-axis” and insert -- y-axis. --.
Line 67, after “more” delete -- 50 --.

Column 12,
Lines 60 and 65, delete “decrees” and insert -- degrees --.

Column 13,
Line 35, delete “on the of” and insert -- on the type of --.

Column 14,
Line 49, delete “the output” and insert -- [the output] --.
Line 49, delete “said outputs” and insert in italics -- said outputs --.

Column 15,
Line 7, after “output of” insert -- from --.
Line 8, delete “decree” and insert -- degree --.

Signed and Sealed this

Fourth Day of November, 2003

JAMES E. ROGAN
*Director of the United States Patent and Trademark Office*